US008663447B2

(12) United States Patent
Bocarsly et al.

(10) Patent No.: US 8,663,447 B2
(45) Date of Patent: Mar. 4, 2014

(54) CONVERSION OF CARBON DIOXIDE TO ORGANIC PRODUCTS

(71) Applicant: Princeton University, Princeton, NJ (US)

(72) Inventors: Andrew B. Bocarsly, Plainsboro, NJ (US); Emily Barton Cole, Houston, TX (US)

(73) Assignee: Princeton University, Princeton, NJ (US)

( * ) Notice: Subject to any disclaimer, the term of this patent is extended or adjusted under 35 U.S.C. 154(b) by 0 days.

(21) Appl. No.: 13/680,890

(22) Filed: Nov. 19, 2012

(65) Prior Publication Data

US 2013/0098772 A1    Apr. 25, 2013

Related U.S. Application Data

(62) Division of application No. 12/696,840, filed on Jan. 29, 2010, now Pat. No. 8,313,634.

(60) Provisional application No. 61/206,286, filed on Jan. 29, 2009.

(51) Int. Cl.
C25B 3/04    (2006.01)

(52) U.S. Cl.
USPC .......................................... 205/450; 205/334

(58) Field of Classification Search
USPC ................................. 205/413, 450
See application file for complete search history.

(56) References Cited

U.S. PATENT DOCUMENTS

| 3,019,256 | A | 1/1962 | Dunn |
| 3,399,966 | A | 9/1968 | Osamu Suzuki et al. |
| 3,401,100 | A | 9/1968 | Macklin |
| 3,560,354 | A | 2/1971 | Young |
| 3,607,962 | A | 9/1971 | Krekeler et al. |
| 3,636,159 | A | 1/1972 | Solomon |
| 3,720,591 | A | 3/1973 | Skarlos |
| 3,745,180 | A | 7/1973 | Rennie |
| 3,764,492 | A | 10/1973 | Baizer et al. |

(Continued)

FOREIGN PATENT DOCUMENTS

| AU | 2012202601 A1 | 5/2012 |
| CA | 2604569 A1 | 10/2006 |

(Continued)

OTHER PUBLICATIONS

Seshadri et al, A New Homogeneous Electrocatalyst for the Reduction of Carbon Dioxide to Methanol at Low Overpotential, Journal of Electroanalytical Chemistry, 372 (1994), 145-50.*

(Continued)

*Primary Examiner* — Keith Hendricks
*Assistant Examiner* — Salil Jain
(74) *Attorney, Agent, or Firm* — Suiter Swantz pc llo

(57) ABSTRACT

The invention relates to various embodiments of an environmentally beneficial method for reducing carbon dioxide. The methods in accordance with the invention include electrochemically or photoelectrochemically reducing the carbon dioxide in a divided electrochemical cell that includes an anode, e.g., an inert metal counterelectrode, in one cell compartment and a metal or p-type semiconductor cathode electrode in another cell compartment that also contains an aqueous solution of an electrolyte and a catalyst of one or more substituted or unsubstituted aromatic amines to produce therein a reduced organic product.

1 Claim, 2 Drawing Sheets

(56) References Cited

U.S. PATENT DOCUMENTS

| | | |
|---|---|---|
| 3,779,875 A | 12/1973 | Michelet |
| 3,899,401 A | 8/1975 | Nohe et al. |
| 3,959,094 A | 5/1976 | Steinberg |
| 4,072,583 A | 2/1978 | Hallcher et al. |
| 4,088,682 A | 5/1978 | Jordan |
| 4,160,816 A | 7/1979 | Williams et al. |
| 4,219,392 A | 8/1980 | Halmann |
| 4,343,690 A | 8/1982 | de Nora |
| 4,381,978 A | 5/1983 | Gratzel et al. |
| 4,414,080 A | 11/1983 | Williams et al. |
| 4,439,302 A | 3/1984 | Wrighton et al. |
| 4,450,055 A | 5/1984 | Stafford |
| 4,451,342 A | 5/1984 | Lichtin et al. |
| 4,460,443 A | 7/1984 | Somorjai et al. |
| 4,474,652 A | 10/1984 | Brown et al. |
| 4,476,003 A | 10/1984 | Frank et al. |
| 4,478,694 A | 10/1984 | Weinberg |
| 4,478,699 A | 10/1984 | Halmann et al. |
| 4,595,465 A | 6/1986 | Ang et al. |
| 4,608,132 A | 8/1986 | Sammells |
| 4,608,133 A | 8/1986 | Morduchowitz et al. |
| 4,609,440 A | 9/1986 | Frese, Jr. et al. |
| 4,609,441 A | 9/1986 | Frese, Jr. et al. |
| 4,609,451 A | 9/1986 | Sammells et al. |
| 4,619,743 A | 10/1986 | Cook |
| 4,620,906 A | 11/1986 | Ang |
| 4,661,422 A | 4/1987 | Marianowski et al. |
| 4,668,349 A | 5/1987 | Cuellar et al. |
| 4,673,473 A | 6/1987 | Ang et al. |
| 4,702,973 A | 10/1987 | Marianowski |
| 4,732,655 A | 3/1988 | Morduchowitz et al. |
| 4,756,807 A | 7/1988 | Meyer et al. |
| 4,776,171 A | 10/1988 | Perry, Jr. et al. |
| 4,793,904 A | 12/1988 | Mazanec et al. |
| 4,824,532 A | 4/1989 | Moingeon et al. |
| 4,855,496 A | 8/1989 | Anderson et al. |
| 4,897,167 A | 1/1990 | Cook et al. |
| 4,902,828 A | 2/1990 | Wickenhaeuser et al. |
| 4,921,586 A | 5/1990 | Molter |
| 4,936,966 A | 6/1990 | Garnier et al. |
| 4,945,397 A | 7/1990 | Schuetz |
| 4,959,131 A | 9/1990 | Cook et al. |
| 5,064,733 A | 11/1991 | Krist et al. |
| 5,198,086 A | 3/1993 | Chlanda et al. |
| 5,246,551 A | 9/1993 | Pletcher et al. |
| 5,284,563 A | 2/1994 | Fujihira et al. |
| 5,290,404 A | 3/1994 | Toomey |
| 5,382,332 A | 1/1995 | Fujihira et al. |
| 5,443,804 A | 8/1995 | Parker et al. |
| 5,514,492 A | 5/1996 | Marincic et al. |
| 5,587,083 A | 12/1996 | Twardowski |
| 5,763,662 A | 6/1998 | Ikariya et al. |
| 5,804,045 A | 9/1998 | Orillon et al. |
| 5,858,240 A | 1/1999 | Twardowski et al. |
| 5,928,806 A | 7/1999 | Olah et al. |
| 6,024,935 A | 2/2000 | Mills et al. |
| 6,187,465 B1 | 2/2001 | Galloway |
| 6,251,256 B1 | 6/2001 | Blay et al. |
| 6,270,649 B1 | 8/2001 | Zeikus et al. |
| 6,409,893 B1 | 6/2002 | Holzbock et al. |
| 6,657,119 B2 | 12/2003 | Lindquist et al. |
| 6,755,947 B2 | 6/2004 | Schulze et al. |
| 6,777,571 B2 | 8/2004 | Chaturvedi et al. |
| 6,806,296 B2 | 10/2004 | Shiroto et al. |
| 6,887,728 B2 | 5/2005 | Miller et al. |
| 6,906,222 B2 | 6/2005 | Slany et al. |
| 6,936,143 B1 | 8/2005 | Graetzel et al. |
| 6,942,767 B1 | 9/2005 | Fazzina et al. |
| 7,037,414 B2 | 5/2006 | Fan |
| 7,052,587 B2 | 5/2006 | Gibson et al. |
| 7,094,329 B2 | 8/2006 | Saha et al. |
| 7,314,544 B2 | 1/2008 | Murphy et al. |
| 7,318,885 B2 | 1/2008 | Omasa |
| 7,338,590 B1 | 3/2008 | Shelnutt et al. |
| 7,361,256 B2 | 4/2008 | Henry et al. |
| 7,378,561 B2 | 5/2008 | Olah et al. |
| 7,704,369 B2 | 4/2010 | Olah et al. |
| 7,883,610 B2 | 2/2011 | Monzyk et al. |
| 8,313,634 B2 | 11/2012 | Bocarsly et al. |
| 2001/0026884 A1 | 10/2001 | Appleby et al. |
| 2003/0029733 A1 | 2/2003 | Otsuka et al. |
| 2004/0089540 A1 | 5/2004 | Van Heuveln et al. |
| 2005/0011755 A1 | 1/2005 | Jovic et al. |
| 2005/0011765 A1 | 1/2005 | Omasa |
| 2005/0051439 A1 | 3/2005 | Jang |
| 2006/0102468 A1 | 5/2006 | Monzyk et al. |
| 2006/0235091 A1 | 10/2006 | Olah et al. |
| 2006/0243587 A1 | 11/2006 | Tulloch et al. |
| 2007/0004023 A1 | 1/2007 | Trachtenberg et al. |
| 2007/0012577 A1 | 1/2007 | Bulan et al. |
| 2007/0045125 A1 | 3/2007 | Hartvigsen et al. |
| 2007/0054170 A1 | 3/2007 | Isenberg |
| 2007/0122705 A1 | 5/2007 | Paulsen et al. |
| 2007/0184309 A1 | 8/2007 | Gust, Jr. et al. |
| 2007/0224479 A1 | 9/2007 | Tadokoro et al. |
| 2007/0231619 A1 | 10/2007 | Strobel et al. |
| 2007/0240978 A1 | 10/2007 | Beckmann et al. |
| 2007/0254969 A1 | 11/2007 | Olah et al. |
| 2007/0282021 A1 | 12/2007 | Campbell |
| 2008/0011604 A1 | 1/2008 | Stevens et al. |
| 2008/0039538 A1 | 2/2008 | Olah et al. |
| 2008/0060947 A1 | 3/2008 | Kitsuka et al. |
| 2008/0072496 A1 | 3/2008 | Yogev et al. |
| 2008/0090132 A1 | 4/2008 | Ivanov et al. |
| 2008/0116080 A1 | 5/2008 | Lal et al. |
| 2008/0145721 A1 | 6/2008 | Shapiro et al. |
| 2008/0223727 A1 | 9/2008 | Oloman et al. |
| 2008/0248350 A1 | 10/2008 | Little et al. |
| 2008/0283411 A1 | 11/2008 | Eastman et al. |
| 2008/0287555 A1 | 11/2008 | Hussain et al. |
| 2008/0296146 A1 | 12/2008 | Toulhoat et al. |
| 2009/0014336 A1 | 1/2009 | Olah et al. |
| 2009/0030240 A1 | 1/2009 | Olah et al. |
| 2009/0038955 A1 | 2/2009 | Rau |
| 2009/0061267 A1 | 3/2009 | Monzyk et al. |
| 2009/0069452 A1 | 3/2009 | Robota |
| 2009/0134007 A1 | 5/2009 | Solis Herrera |
| 2009/0277799 A1 | 11/2009 | Grimes |
| 2010/0084280 A1 | 4/2010 | Gilliam et al. |
| 2010/0147699 A1 | 6/2010 | Wachsman et al. |
| 2010/0150802 A1 | 6/2010 | Gilliam et al. |
| 2010/0180889 A1 | 7/2010 | Monzyk et al. |
| 2010/0187123 A1 | 7/2010 | Bocarsly et al. |
| 2010/0187125 A1 | 7/2010 | Sandoval et al. |
| 2010/0191010 A1 | 7/2010 | Bosman et al. |
| 2010/0193370 A1 | 8/2010 | Olah et al. |
| 2010/0196800 A1 | 8/2010 | Markoski et al. |
| 2010/0213046 A1 | 8/2010 | Grimes et al. |
| 2010/0248042 A1 | 9/2010 | Nakagawa et al. |
| 2010/0307912 A1 | 12/2010 | Zommer |
| 2011/0014100 A1 | 1/2011 | Bara et al. |
| 2011/0083968 A1 | 4/2011 | Gillliam et al. |
| 2011/0114501 A1 | 5/2011 | Teamey et al. |
| 2011/0114502 A1 | 5/2011 | Cole et al. |
| 2011/0114503 A1 | 5/2011 | Sivasankar et al. |
| 2011/0114504 A1 | 5/2011 | Sivasankar et al. |
| 2011/0143929 A1 | 6/2011 | Sato et al. |
| 2011/0186441 A1 | 8/2011 | LaFrancois et al. |
| 2011/0226632 A1 | 9/2011 | Cole et al. |
| 2011/0237830 A1 | 9/2011 | Masel |
| 2012/0043301 A1 | 2/2012 | Arvin et al. |
| 2012/0228147 A1 | 9/2012 | Sivasankar et al. |
| 2012/0292196 A1 | 11/2012 | Albrecht et al. |
| 2012/0295172 A1 | 11/2012 | Peled et al. |
| 2012/0298522 A1 | 11/2012 | Shipchandler et al. |
| 2012/0329657 A1 | 12/2012 | Eastman et al. |
| 2013/0062216 A1 | 3/2013 | Yotsuhashi et al. |
| 2013/0098772 A1 | 4/2013 | Bocarsly et al. |
| 2013/0105304 A1 | 5/2013 | Kaczur et al. |
| 2013/0105330 A1 | 5/2013 | Teamey et al. |
| 2013/0118911 A1 | 5/2013 | Sivasankar et al. |
| 2013/0134048 A1 | 5/2013 | Teamey et al. |

(56) References Cited

U.S. PATENT DOCUMENTS

| | | | |
|---|---|---|---|
| 2013/0134049 | A1 | 5/2013 | Teamey et al. |
| 2013/0140187 | A1 | 6/2013 | Teamey et al. |
| 2013/0180863 | A1 | 7/2013 | Kaczur et al. |

FOREIGN PATENT DOCUMENTS

| | | |
|---|---|---|
| DE | 1047765 A | 12/1958 |
| DE | 2301032 A | 7/1974 |
| EP | 0111870 B1 | 12/1983 |
| EP | 0081982 B1 | 5/1985 |
| EP | 0277048 B1 | 3/1988 |
| EP | 0390157 B1 | 5/2000 |
| FR | 853643 | 3/1940 |
| FR | 2780055 A1 | 12/1999 |
| JP | 62120489 A | 6/1987 |
| JP | 64-015388 | 1/1989 |
| JP | 07258877 A | 10/1995 |
| JP | 2004344720 A | 12/2004 |
| JP | 2006188370 A | 7/2006 |
| JP | 2007185096 A | 7/2007 |
| KR | 20040009875 A | 1/2004 |
| WO | WO 9724320 A1 | 7/1997 |
| WO | WO9850974 A1 | 11/1998 |
| WO | WO 0015586 A1 | 3/2000 |
| WO | WO0025380 A2 | 5/2000 |
| WO | WO02059987 A3 | 8/2002 |
| WO | WO 03004727 A2 | 1/2003 |
| WO | WO 2004067673 A1 | 8/2004 |
| WO | 2007041872 A1 | 4/2007 |
| WO | WO2007041872 A1 | 4/2007 |
| WO | WO 2007041872 A1 | 4/2007 |
| WO | WO2007058608 A1 | 5/2007 |
| WO | WO2007119260 A2 | 10/2007 |
| WO | WO2008016728 A2 | 2/2008 |
| WO | WO2008017838 A1 | 2/2008 |
| WO | WO2008124538 A1 | 10/2008 |
| WO | WO2009002566 A1 | 12/2008 |
| WO | WO2009145624 A1 | 12/2009 |
| WO | WO2010010252 A2 | 1/2010 |
| WO | WO2010042197 A1 | 4/2010 |
| WO | WO2010088524 A2 | 8/2010 |
| WO | WO2010138792 A1 | 12/2010 |
| WO | WO2011010109 A1 | 1/2011 |
| WO | WO2011068743 A2 | 6/2011 |
| WO | WO2011120021 A1 | 9/2011 |
| WO | WO2011123907 A1 | 10/2011 |
| WO | WO2011133264 A1 | 10/2011 |
| WO | WO 2012046362 A1 | 4/2012 |

OTHER PUBLICATIONS

Green et al., "Vapor-Liquid Equilibria of Formaldehyde-Methanol-Water", Industrial and Engineering Chemistry (Jan. 1955), vol. 47, No. 1, pp. 103-109.

Shibata et al., "Electrochemical Synthesis of Urea at Gas-Diffusion Electrodes Part VI. Simultaneous Reduction of Carbon Dioxide and Nitrite Ions with Various Metallophthalocyanine Catalysts". J. of Electroanalytical Chemistry (no month, 2001), vol. 507, pp. 177-184.

Jaaskelainen and Haukka, The Use of Carbon Dioxide in Ruthenium Carbonyl Catalyzed 1-hexene Hydroformylation Promoted by Alkali Metal and Alkaline Earth Salts, Applied Catalysis A: General, 247, 95-100 (2003).

Heldebrant et al., "Reversible Zwitterionic Liquids, The Reaction of Alkanol Guanidines, Alkanol Amidines, and Diamines wih CO2", Green Chem. (mo month, 2010), vol. 12, pp. 713-721.

Perez et al., "Activation of Carbon Dioxide by Bicyclic Amidines", J. Org. Chem. (no month, 2004), vol. 69, pp. 8005-8011.

Hori, Kikuchi, and Suzuki; Production of CO and CH4 in Electrochemical Reduction of CO2 at Metal Electrodes in Aqueous Hydrogencarbonate Solution; Chemistry Letters, pp. 1695-1698, 1985. (C) 1985 The Chemical Society of Japan.

Jitaru, Lowy, M. Toma, B.C. Toma, Oniciu; Electrochemical reduction of carbon dioxide on flat metallic cathodes; Journal of Applied Electrochemistry 27 (1997) pp. 875-889, Reviews in Applied Electrochemistry No. 45.

Kaneco, Iwao, Iiba, Itoh, Ohta, and Mizuno; Electrochemical Reduction of Carbon Dioxide on an Indium Wire in a KOH/Methanol-Based Electrolyte at Ambient Temperature and Pressure; Environmental Engineering Science; vol. 16, No. 2, 1999, pp. 131-138.

Todoroki, Hara, Kudo, and Sakata; Electrochemical reduction of high pressure CO2 at Pb, Hg and In electrodes in an aqueous KHCO3 solution; Journal of Electroanalytical Chemistry 394 (1995) 199-203.

R.P.S. Chaplin and A.A. Wragg, Effects of process conditions and electrode material on reaction pathways for carbon dioxide electroreduction with particular reference to formate formation, Journal of Applied Electrochemistry 33:1107-1123, 2003, Copyright 2003 Kluwer Academic Publishers. Printed in the Netherlands.

Kapusta and Hackerman; The Electroreduction of Carbon Dioxide and Formic Acid on Tin and Indium Electrodes, J. Electrochem. Doc.: Electrochemical Science and Technology, vol. 130, No. 3 Mar. 1983, pp. 607-613.

M. N. Mahmood, D. Masheder, and C. J. Harty; Use of gas-diffusion electrodes for high-rate electrochemical reduction of carbon dioxide. I. Reduction at lead, indium- and tin-impregnated electrodes; Journal of Applied Electrochemistry 17 (1987) 1159-1170.

Y. Hori, Electrochemical CO2 Reduction on Metal Electrodes, Modern Aspects of Electrochemistry, No. 42, edited by C. Vayenas et al., Springer, New York, 2008, pp. 89-189.

Yoshio Hori, Hidetoshi Wakebe, Toshio Tsukamoto and Osamu Koga; Electrocatalytic Process of CO Selectivity in Electrochemical Reductionof CO2 at Metal Electrodes in Aqueous Media; Electrochimica Acta, vol. 39, No. 11/12, pp. 1833-1839, 1994, Copyright 1994 Elsevier Science Ltd., Printed in Great Britain.

Noda, Ikeda, Oda, Imai, Maeda, and Ito; Electrochemical Reduction of Carbon Dioxide at Various Metal Electrodes in Aqueous Potassium Hydrogen Carbonate Solution; Bull. Chem. Soc. Jpn., 63, 2459-2462, 1990, Copyright 1990 The Chemical Society of Japan.

Azuma, Hashimoto, Hiramoto, Watanbe, and Sakata; Carbon dioxide reduction at low temperature on various metal electrodes; J. Electroanal. Chem., 260 (1989) 441-445, Elsevier Sequoia S.A., Lausanne—Printed in The Netherlands.

Vassiliev, Bagotzky, Khazova, and Mayorova; Electroreduction of Carbon Dioxide, Part II. The Mechanism of Reduction in Aprotic Solvents, J. Electroanal. Chem. 189 (1985) 295-309, Elsevier Sequoia S.A., Lausanne—Printed in The Netherlands.

Vassiliev, Bagotzky, Khazova, and Mayorova; Electroreduction of Carbon Dioxide, Part I. The Mechanism and Kinetics of Electroreduction of CO2 in Aqueous Solutions on Metals with High and Moderate Hydrogen Overvoltages, J. Electroanal. Chem. 189 (1985) 271-294, Elsevier Sequoia S.A., Lausanne—Printed in The Netherlands.

Ikeda, Takagi, and Ito; Selective Formation of Formic Acid, Oxalic Acid, and Carbon Monoxide by Electrochemical Reduction of Carbon Dioxide, Bull. Chem. Soc. Jpn., 60, 2517-2522.

Shibata, Yoshida, and Furuya; Electrochemical Synthesis of Urea at Gas-Diffusion Electrodes, IV. Simultaneous Reduction of Carbon Dioxide and Nitrate Ions with Various Metal Catalysts; J. Electrochem. Soc., vol. 145, No. 7, Jul. 1998 The Electrochemical Society, Inc., pp. 2348-2353.

F. Richard Keene, Electrochemical and Electrocatalytic Reactions of Carbon Dioxide—Chapter 1: Thermodynamic, Kinetic, and Product Considerations in Carbon Dioxide Reactivity, Elsevier, Amsterdam, 1993, pp. 1-17.

Sammells and Cook, Electrochemical and Electrocatalytic Reactions of Carbon Dioxide—Chapter 7: Electrocatalysis and Novel Electrodes for High Rate CO2 Reduction Under Ambient Conditions, Elsevier, Amsterdam, 1993, pp. 217-262.

W.W. Frese, Jr., Electrochemical and Electrocatalytic Reactions of Carbon Dioxide—Chapter 6: Electrochemical Reduction of CO2 at Solid Electrodes, Elsevier, Amsterdam, 1993, pp. 145-215.

Halmann and Steinberg, Greenhouse gas carbon dioxide mitigation: science and technology—Chapter 11: Photochemical and Radiation-Induced Activation of CO2 in Homogeneous Media, CRC Press, 1999, pp. 391-410.

(56) References Cited

OTHER PUBLICATIONS

Halmann and Steinberg, Greenhouse gas carbon dioxide mitigation: science and technology—Chapter 12: Electrochemical Reduction of CO2, CRC Press, 1999, pp. 411-515.

Halmann and Steinberg, Greenhouse gas carbon dioxide mitigation: science and technology—Chapter 13: Photoelectrochemical Reduction of CO2, CRC Press, 1999, pp. 517-527.

Colin Oloman and Hui Li, Electrochemical Processing of Carbon Dioxide, ChemSusChem 2008, 1, 385-391, Copyright 2008 Wiley-VCH Verlag GmbH& Co. KGaA, Weinheim, www.chemsuschem.org.

Hui Li and Colin Oloman, Development of a continuous reactor for the electro-reduction of carbon dioxide to formate—Part 1: Process variables, Journal of Applied Electrochemistry (2006) 36:1105-1115, Copyright Springer 2006.

Hui Li and Colin Oloman, Development of a continuous reactor for the electro-reduction of carbon dioxide to formate—Part 2: Scale-up, J Appl Electrochem (2007) 37:1107-1117.

Hui Li and Colin Oloman, The electro-reduction of carbon dioxide in a continuous reactor, Journal of Applied Electrochemistry (2005) 35:955-965, Copyright Springer 2005.

PCT International Search Report dated Dec. 13, 2011, PCT/US11/45515, 2 pages.

Andrew P. Doherty, Electrochemical reduction of butraldehyde in the presence of CO2, Electrochimica Acta 47 (2002) 2963-2967, Copyright 2002 Elsevier Science Ltd.

Seshadri, Lin, and Bocarsly; A new homogeneous electrocatalyst for the reduction of carbon dioxide to methanol at low overpotential; Journal of Electroanalytical Chemistry, 372 (1994) 145-150.

PCT International Search Report dated Dec. 15, 2011, PCT/US11/45521, 2 pages.

Fan et al., Semiconductor Electrodes. 27. The p- and n-GaAs-N, N?—Dimet h y1-4,4'-bipyridinium System. Enhancement of Hydrogen Evolution on p-GaAs and Stabilization of n-GaAs Electrodes, Journal of the American Chemical Society, vol. 102, Feb. 27, 1980, pp. 1488-1492.

PCT International Search Report dated Jun. 23, 2010, PCT/US10/22594, 2 pages.

Emily Barton Cole and Andrew B. Bocarsly, Carbon Dioxide as Chemical Feedstock, Chapter 11—Photochemical, Electrochemical, and Photoelectrochemical Reduction of Carbon Dioxide, Copyright 2010 Wiley-VCH Verlag GmbH & Co. KGaA, Weinheim, 26 pages.

Barton Cole, Lakkaraju, Rampulla, Morris, Abelev, and Bocarsly; Using a One-Electron Shuttle for the Multielectron Reduction of CO2 to Methanol: Kinetic, Mechanistic, and Structural Insights; Mar. 29, 2010, 13 pages.

Morris, McGibbon, and Bocarsly; Electrocatalytic Carbon Dioxide Activation: The Rate-Determining Step of Pyridinium-Catalyzed CO2 Reduction; ChemSusChem 2011, 4, 191-196, Copyright 2011 Wiley-VCH Verlag GmbH& Co. KGaA, Weinheim.

Emily Barton Cole, Pyridinium-Catalyzed Electrochemical and Photoelectrochemical Conversion of CO2 to Fuels: A Dissertation Presented to the Faculty of Princeton University in Candidacy for the Degree of Doctor of Philosophy, Nov. 2009, pp. 1-141.

Barton, Rampulla, and Bocarsly; Selective Solar-Driven Reduction of CO2 to Methanol Using a Catalyzed p-GaP Based Photoelectrochemical Cell; Oct. 3, 2007, 3 pages.

Mostafa Hossain, Nagaoka, and Ogura; Palladium and cobalt complexes of substituted quinoline, bipyridine and phenanthroline as catalysts for electrochemical reduction of carbon dioxide; Electrochimica Acta, vol. 42, No. 16, pp. 2577-2585, 1997.

Keene, Creutz, and Sutin; Reduction of Carbon Dioxide by Tris(2,2'-Bipyridine)Cobalt(I), Coordination Chemistry Reviews, 64 (1995) 247-260, Elsevier Science Publishers B.V., Amsterdam—Printed in The Netherlands.

Aurian-Blajeni, Halmann, and Manassen; Electrochemical Measurements on the Photoelectrochemical Reduction of Aqueous Carbon Dioxide on p-Gallium Phosphide and p-Gallium Arsenide Semiconductor Electrodes, Solar Energy Materials 8 (1983) 425-440, North-Holland Publishing Company.

Tan, Zou, and Hu; Photocatalytic reduction of carbon dioxide into gaseous hydrocarbon using TiO2 pellets; Catalysis Today 115 (2006) 269-273.

Bandi and Kuhne, Electrochemical Reduction of Carbon Dioxide in Water: Analysis of Reaction Mechanism on Ruthenium—Titanium—Oxide, J. Electrochem. Soc., vol. 139, No. 6, Jun. 1992 (C) The Electrochemical Society, Inc., pp. 1605-1610.

B. Beden, A. Bewick and C. Lamy, A Study by Electrochemically Modulated Infrared Reflectance Spectroscopy of the Electrosorption of Formic Acid At a Platinum Electrode, J. Electroanal. Chem., 148 (1983) 147-160, Elsevier Sequoia S.A., Lausanne—Printed in The Netherlands.

Bell and Evans, Kinetics of the Dehydration of Methylene Glycol in Aqueous Solution, Proceedings of the Royal Society of London, Series A, Mathematical and Physical Sciences, vol. 291, No. 1426 (Apr. 26, 1966), pp. 297-323.

Bian, Sumi, Furue, Sato, Kolke, and Ishitani; A Novel Tripodal Ligand, Tris[(4'-methyl-2,2'-bipyridyl-4-yl)-methyl]carbinol and Its Trinuclear RuII/ReI Mixed-Metal Complexes: Synthesis, Emission Properties, and Photocatalytic CO2 Reduction; Inorganic Chemistry, vol. 47, No. 23, 2008, pp. 10801-10803.

T. Bundgaard, H. J. Jakobsen, and E. J. Rahkamaa; A High-Resolution Investigation of Proton Coupled and Decoupled 13C FT NMR Spectra of 15N-Pyrrole; Journal of Magnetic Resonance 19,345-356 (1975).

D. Canfield and K. W. Frese, Jr, Reduction of Carbon Dioxide to Methanol on n- and p-GaAs and p-InP. Effect of Crystal Face, Electrolyte and Current Density, Journal of the Electrochemical Society, vol. 130, No. 8, Aug. 1983, pp. 1772-1773.

Arakawa, et al., Catalysis Research of Relevance to Carbon Management: Progress, Challenges, and Opportunities, Chem. Rev. 2001, 101, 953-996.

Chang, Ho, and Weaver; Applications of real-time infrared spectroscopy to electrocatalysis at bimetallic surfaces, I. Electrooxidation of formic acid and methanol on bismuth-modified Pt(111) and Pt(100), Surface Science 265 (1992) 81-94.

S. Clarke and J. A. Harrison, The Reduction of Formaldehyde, Electroanalytical Chemistry and Interfacial Electrochemistry, J. Electroanal. Chem., 36 (1972), pp. 109-115, Elsevier Sequoia S.A., Lausanne Printed in The Netherlands.

Li, Markley, Mohan, Rodriguez-Santiago, Thompson, and Van Niekerk; Utilization of Carbon Dioxide From Coal-Fired Power Plant for the Production of Value-Added Products; Apr. 27, 2006, 109 pages.

Jean-Marie Lehn and Raymond Ziessel, Photochemical generation of carbon monoxide and hydrogen by reduction of carbon dioxide and water under visible light irradiation, Proc. Natl. Acad. Sci. USA, vol. 79, pp. 701-704, Jan. 1982, Chemistry.

Li and Prentice, Electrochemical Synthesis of Methanol from CO2 in High-Pressure Electrolyte, J. Electrochem. Soc., vol. 144, No. 12, Dec. 1997 © The Electrochemical Society, Inc., pp. 4284-4288.

Azuma, Hashimoto, Hiramoto, Watanabe, and Sakata; Carbon dioxide reduction at low temperature on various metal electrodes, J. Electroanal. Chem., 260 (1989) 441-445, Elsevier Sequoia S.A., Lausanne—Printed in The Netherlands.

Goettmann, Thomas, and Antonietti; Metal-Free Activation of CO2 by Mesoporous Graphitic Carbon Nitride; Angewandte Chemie; Angew. Chem. Int. Ed. 2007, 46, 2717-2720.

Yu B Vassiliev, V S Bagotzky, O.A. Khazova and NA Mayorova; Electroreduction of Carbon Dioxide Part II. The Mechanism of Reduction in Aprotic Solvents, J Electroanal. Chem, 189 (1985) 295-309 Elsevier Sequoia S.A. , Lausanne—Printed in The Netherlands.

Whipple, Finke, and Kenis; Microfluidic Reactor for the Electrochemical Reduction of Carbon Dioxide: The Effect of pH; Electrochemical and Solid-State Letters, 13 (9) B109-B111 (2010), 1099-0062/2010/13(9)/B109/3/$28.00 © The Electrochemical Society.

Zhai, Chiachiarelli, and Sridhar; Effects of Gaseous Impurities on the Electrochemical Reduction of CO2 on Copper Electrodes; ECS Transactions, 19 (14) 1-13 (2009), 10.1149/1.3220175 © The Electrochemical Society.

(56) References Cited

OTHER PUBLICATIONS

R.D.L. Smith, P.G. Pickup, Nitrogen-rich polymers for the electrocatalytic reduction of CO2, Electrochem. Commun. (2010), doi:10.1016/j.elecom.2010.10.013.

B.Z. Nikolic, H. Huang, D. Gervasio, A. Lin, C. Fierro, R.R. Adzic, and E.B. Yeager; Electroreduction of carbon dioxide on platinum single crystal electrodes: electrochemical and in situ FTIR studies; J. Electmanal. Chem., 295 (1990) 415-423; Elsevier Sequoia S.A., Lausanne.

Nogami, Itagaki, and Shiratsuchi; Pulsed Electroreduction of CO2 on Copper Electrodes-II; J. Electrochem. Soc., vol. 141, No. 5, May 1994 © The Electrochemical Society, Inc., pp. 1138-1142.

Ichiro Oda, Hirohito Ogasawara, and Masatoki Ito; Carbon Monoxide Adsorption on Copper and Silver Electrodes during Carbon Dioxide Electroreduction Studied by Infrared Reflection Absorption Spectroscopy and Surface-Enhanced Raman Spectroscopy; Langmuir 1996, 12, 1094-1097.

Kotaro Ogura,, Kenichi Mine, Jun Yano, and Hideaki Sugihara; Electrocatalytic Generation of C2 and C3 Compounds from Carbon Dioxide on a Cobalt Complex-immobilized Dual-film Electrode; J. Chem. Soc., Chem. Commun., 1993, pp. 20-21.

Ohkawa, Noguchi, Nakayama, Hashimoto, and Fujishima; Electrochemical reduction of carbon dioxide on hydrogen-storing materials Part 3. The effect of the absorption of hydrogen on the palladium electrodes modified with copper; Journal of Electroanalytical Chemistry, 367 (1994) 165-173.

Sanchez-Sanchez, Montiel, Tryk, Aldaz, and Fujishima; Electrochemical approaches to alleviation of the problem of carbon dioxide accumulation; Pure Appl. Chem., vol. 73, No. 12, pp. 1917-1927, 2001, © 2001 IUPAC.

D. J. Pickett and K. S. Yap, A study of the production of glyoxylic acid by the electrochemical reduction of oxalic acid solutions, Journal of Applied Electrochemistry 4 (1974) 17-23, Printed in Great Britain, © 1974 Chapman and Hall Ltd.

Bruce A. Parkinson & Paul F. Weaver, Photoelectrochemical pumping of enzymatic CO2 reduction, Nature, vol. 309, May 10, 1984, pp. 148-149.

Paul, Tyagi, Bilakhiya, Bhadbhade, Suresh, and Ramachandraiah; Synthesis and Characterization of Rhodium Complexes Containing 2,4,6-Tris(2-pyridyl)-1,3,5-triazine and Its Metal-Promoted Hydrolytic Products: Potential Uses of the New Complexes in Electrocatalytic Reduction of Carbon Dioxide; Inorg. Chem. 1998, 37, 5733-5742.

Furuya, Yamazaki, and Shibata; High performance Ru—Pd catalysts for CO2 reduction at gas-diffusion electrodes, Journal of Electroanalytical Chemistry 431 (1997) 39-41.

Petit, Chartier, Beley, and Deville; Molecular catalysts in photoelectrochemical cells Study of an efficient system for the selective photoelectroreduction of CO2: p-GaP or p-GaAs / Ni( cyclam) 2+, aqueous medium; J. Electroanal. Chem., 269 (1989) 267-281; Elsevier Sequoia S.A., Lausanne—Printed in The Netherlands.

Popic, Avramov-Ivic, and Vukovic; Reduction of carbon dioxide on ruthenium oxide and modified ruthenium oxide electrodes in 0.5 M NaHCO3, Journal of Electroanalytical Chemistry 421 (1997) 105-110.

Whipple and Kenis, Prospects of CO2 Utilization via Direct Heterogeneous Electrochemical Reduction, J. Phys. Chem. Lett. 2010, 1, 3451-3458, © 2010 American Chemical Society.

P.A. Christensen & S.J. Higgins, Preliminary note the electrochemical reduction of CO2 to oxalate at a Pt electrode immersed in acetonitrile and coated with polyvinylalcohol/[Ni(dppm)2Cl2], Journal of Electroanalytical Chemistry, 387 (1995) 127-132.

Qu, Zhang, Wang, and Xie; Electrochemical reduction of CO2 on RuO2/TiO2 nanotubes composite modified Pt electrode, Electrochimica Acta 50 (2005) 3576-3580.

Jin, Gao, Jin, Zhang, Cao,; Wei, and Smith; High-yield reduction of carbon dioxide into formic acid by zero-valent metal/metal oxide redox cycles; Energy Environ. Sci., 2011, 4, pp. 881-884.

Yu B Vassiliev, V S Bagotzky. N V Osetrova and A A Mikhailova; Electroreduction of Carbon Dioxide Part III. Adsorption and Reduction of CO2 on Platinum Metals; J Electroanal Chem. 189 (1985) 311-324, Elsevier Sequoia SA, Lausanne—Printed in The Netherlands.

M. Gattrell, N. Gupta, and A. Co; A review of the aqueous electrochemical reduction of CO2 to hydrocarbons at copper; Journal of Electroanalytical Chemistry 594 (2006) 1-19.

Hoshi, Ito, Suzuki, and Hori; Preliminary note CO 2 Reduction on Rh single crystal electrodes and the structural effect; Journal of Electroanalytical Chemistry 395 (1995) 309-312.

Rudolph, Dautz, and Jager; Macrocyclic [N42-] Coordinated Nickel Complexes as Catalysts for the Formation of Oxalate by Electrochemical Reduction of Carbon Dioxide; J. Am. Chem. Soc. 2000, 122, 10821-10830, Published on Web Oct. 21, 2000.

Ryu, Andersen, and Eyring; The Electrode Reduction Kinetics of Carbon Dioxide in Aqueous Solution; The Journal of Physical Chemistry, vol. 76, No. 22, 1972, pp. 3278-3286.

Zhao, Jiang, Han, Li, Zhang, Liu, Hi, and Wu; Electrochemical reduction of supercritical carbon dioxide in ionic liquid 1-n-butyl-3-methylimidazolium hexafluorophosphate; J. of Supercritical Fluids 32 (2004) 287-291.

Schwartz, Cook, Kehoe, MacDuff, Patel, and Sammells; Carbon Dioxide Reduction to Alcohols using Perovskite-Type Electrocatalysts; J. Electrochem. Soc., vol. 140, No. 3, Mar. 1993 © The Electrochemical Society, Inc., pp. 614-618.

Ikeda, Takagi, and Ito; Selective Formation of Formic Acid, Oxalic Acid, and Carbon Monoxide by Electrochemical Reduction of Carbon Dioxide; Bull. Chem. Soc. Jpn., 60, 2517-2522 (1987) © 1987 The Chemical Society of Japan.

Shiratsuchi, Aikoh, and Nogami; Pulsed Electroreduction of CO2 on Copper Electrodes; J, Electrochem. Soc., vol. 140, No. 12, Dec. 1993 © The Electrochemical Society, Inc.

Centi & Perathoner; Towards Solar Fuels from Water and CO2; ChemSusChem 2010, 3, 195-208, © 2010 Wiley-VCH Verlag GmbH& Co. KGaA, Weinheim.

David P. Summers, Steven Leach and Karl W. Frese Jr.; The Electrochemical Reduction of Aqueous Carbon Dioxide to Methanol at Molybdenum Electrodes With Low Overpotentials; J Electroanal. Chem., 205 (1986) 219-232, Elsevier Sequoia S.A., Lausanne—Printed in The Netherlands.

Isao Taniguchi, Benedict Aurian-Blajeni and John O'M. Bockris; Photo-Aided Reduction of Carbon Dioxide to Carbon Monoxide; J. Electroanal. Chem, 157 (1983) 179-182, Elsevier Sequoia S.A., Lausanne—Printed in The Netherlands.

Isao Taniguchi, Benedict Aurian-Blajeni and John O'M. Bockris; The Mediation of the Photoelectrochemical Reduction of Carbon Dioxide by Ammonium Ions; J. Electroanal. Chem, 161 (1984) 385-388, Elsevier Sequoia S.A., Lausanne—Printed in The Netherlands.

Hiroshi Yoneyama, Kenji Sugimura and Susumu Kuwabata; Effects of Electrolytes on the Photoelectrochemical Reduction of Carbon Dioxide at Illuminated p-Type Cadmium Telluride and p-Type Indium Phosphide Electrodes in Aqueous Solutions; J. Electroanal. Chem., 249 (1988) 143-153, Elsevier Sequoia , S.A., Lausanne—Printed in The Netherlands.

Whipple, Finke, and Kenis; Microfluidic Reactor for the Electrochemical Reduction of Carbon Dioxide: The Effect of pH; Electrochemical and Solid-State Letters, 13 (9) B109-B111 (2010).

YLB Vassiliev, V S Bagotzky, N V. Osetrov, O.A. Khazova and NA Mayorova; Electroreduction of Carbon Dioxide Part I. The Mechanism and Kinetics of Electroreduction of CO2 in Aqueous Solutions on Metals with High and Moderate Hydrogen Overvoltages; J Electroanal. Chem. 189 (1985) 271-294, Elsevier Sequoia SA , Lausanne—Printed in The Netherlands.

YLB Vassiliev, V S Bagotzky, N V. Osetrov, O.A. Khazova and NA Mayorova; Electroreduction of Carbon Dioxide Part II. The Mechanism of Reduction in Aprotic Solvents; J Electroanal. Chem. 189 (1985) 295-309, Elsevier Sequoia SA , Lausanne—Printed in The Netherlands.

Watanabe, Shibata, Kato, Azuma, and Sakata; Design of Alloy Electrocatalysts for C02 Reduction III. The Selective and Reversible Reduction of C02 on Cu Alloy Electrodes; J. Electrochem. Soc., vol. 138, No. 11, Nov. 1991 © The Electrochemical Society, Inc., pp. 3382-3389.

(56) References Cited

OTHER PUBLICATIONS

Soichiro Yamamura, Hiroyuki Kojima, Jun Iyoda and Wasaburo Kawai; Photocatalytic Reduction of Carbon Dioxide with Metal-Loaded SiC Powders; J. Elecironal. Chem., 247 (1988) 333-337, Elsevier Sequoia S.A., Lausanne—Printed in The Netherlands.

R. Piercy, N. A. Hampson; The electrochemistry of indium, Journal of Applied Electrochemistry 5 (1975) 1-15, Printed in Great Britain, © 1975 Chapman and Hall Ltd.

C. K. Watanabe, K. Nobe; Electrochemical behaviour of indium in H2S04, Journal of Applied Electrochemistry 6 (1976) 159-162, Printed in Great Britain, © 1976 Chapman and Hall Ltd.

Yumi Akahori, Nahoko Iwanaga, Yumi Kato, Osamu Hamamoto, and Mikita Ishii; New Electrochemical Process for CO2 Reduction to from Formic Acid from Combustion Flue Gases; Electrochemistry; vol. 72, No. 4 (2004), pp. 266-270.

Hamamoto, Akahori, Goto, Kato, and Ishii; Modified Carbon Fiber Electrodes for Carbon Dioxide Reduction; Electrochemistry, vol. 72, No. 5 (2004), pp. 322-327.

S. Omanovicâ, M. Metikosï-Hukovic; Indium as a cathodic material: catalytic reduction of formaldehyde; Journal of Applied Electrochemistry 27 (1997) 35-41.

Hara, Kudo, and Sakata; Electrochemical reduction of carbon dioxide under high pressure on various electrodes in an aqueous electrolyte; Journal of Electroanalytical Chemistry 391 (1995) 141-147.

Stephen K. Ritter, What Can We Do With Carbon Dioxide? Scientists are trying to find ways to convert the plentiful greenhouse gas into fuels and other value-added products, Chemical & Engineering News, Apr. 30, 2007, vol. 85, No. 18, pp. 11-17, http://pubs.acs.org/cen/coverstory/85/8518cover.html.

Toshio Tanaka, Molecular Orbital Studies on the Two-Electron Reduction of Carbon Dioxide to Give Formate Anion, Memoirs of Fukui University of Technology, vol. 23, Part 1, 1993, pp. 223-230.

Columbia, Crabtree, and Thiel; The Temperature and Coverage Dependences of Adsorbed Formic Acid and Its Conversion to Formate on Pt(111), J. Am. Chem. Soc., vol. 114, No. 4, 1992, pp. 1231-1237.

Brian R. Eggins and Joanne McNeill, Voltammetry of Carbon Dioxide, Part I. A General Survey of Voltammetry at Different Electrode Materials in Different Solvents, J. Electroanal. Chem., 148 (1983) 17-24, Elsevier Sequoia S.A., Lausanne—Printed in The Netherlands.

Varghese, Paulose, Latempa, and Grimes; High-Rate Solar Photocatalytic Conversion of CO2 and Water Vapor to Hydrocarbon Fuels; Nano Letters, 2009, vol. 9, No. 2, pp. 731-737.

Han, Chu, Kim, Song, and Kim; Photoelectron spectroscopy and ab initio study of mixed cluster anions of [(CO21-3(Pyridine)1-6: Formation of a covalently bonded anion core of (C5H5N—CO2), Journal of Chemical Physics, vol. 113, No. 2, Jul. 8, 2000, pp. 596-601.

Heinze, Hempel, and Beckmann; Multielectron Storage and Photo-Induced Electron Transfer in Oligonuclear Complexes Containing Ruthenium(II) Terpyridine and Ferrocene Building Blocks, Eur. J. Inorg. Chem. 2006, 2040-2050.

Lin and Frei, Bimetallic redox sites for photochemical CO2 splitting in mesoporous silicate sieve, C. R. Chimie 9 (2006) 207-213.

Heyduk, MacIntosh, and Nocera; Four-Electron Photochemistry of Dirhodium Fluorophosphine Compounds, J. Am. Chem. Soc. 1999, 121, 5023-5032.

Witham, Huang, Tsung, Kuhn, Somorjai, and Toste; Converting homogeneous to heterogeneous in electrophilic catalysis using monodisperse metal nanoparticles, Nature Chemistry, DOI: 10.1038/NCHEM.468, pp. 1-6, 2009.

Hwang and Shaka, Water Suppression That Works. Excitation Sculpting Using Arbitrary Waveforms and Pulsed Field Gradients, Journal of Magnetic Resonance, Series A 112, 275-279 (1995).

Weissermel and Arpe, Industrial Organic Chemistry, 3rd Edition 1997, Published jointly by VCH Verlagsgesellschaft mbH, Weinheim (Federal Republic of Germany) VCH Pubiishers, Inc., New York, NY (USA), pp. 1-481.

T. Iwasita, . C. Nart, B. Lopez and W. Vielstich; On the Study of Adsorbed Species at Platinum From Methanol, Formic Acid and Reduced Carbon Dioxide Via In Situ FT-ir Spectroscopy, Electrochimica Atca, vol. 37. No. 12. pp. 2361-2367, 1992, Printed in Great Britain.

Lackner, Grimes, and Ziock; Capturing Carbon Dioxide From Air; pp. 1-15.

Kang, Kim, Lee, Hong, and Moon; Nickel-based tri-reforming catalyst for the production of synthesis gas, Applied Catalysis, A: General 332 (2007) 153-158.

Kostecki and Augustynski, Electrochemical Reduction of CO2 at an Activated Silver Electrode, Ber. Bunsenges. Phys. Chem. 98, 1510-1515 (1994) No. 12 C VCH Verlagsgesellschaft mbH, 0-69451 Weinheim, 1994.

Kunimatsu and Kita; Infrared Spectroscopic Study of Methanol and Formic Acid Adsorrates on a Platinum Electrode, Part II. Role of the Linear CO(a) Derived From Methanol and Formic Acid in the Electrocatalytic Oxidation of CH, OH and HCOOH, J Electroanal Chem., 218 (1987) 155-172, Elsevier Sequoia S A , Lausanne—Printed in The Netherlands.

Lichter and Roberts, 15N Nuclear Magnetic Resonance Spectroscopy. XIII. Pyridine-15N1, Journal of the American Chemical Society 1 93:20 1 Oct. 6, 1971, pp. 5218-5224.

R.J.L. Martin, The Mechanism of the Cannizzaro Reaction of Formaldehyde, May 28, 1954, pp. 335-347.

Fujitani, Nakamura, Uchijima, and Nakamura; The kinetics and mechanism of methanol synthesis by hydrogenation of C02 over a Zn-deposited Cu(111surface, Surface Science 383 (1997) 285-298.

Richard S. Nicholson and Irving Shain, Theory of Stationary Electrode Polarography, Single Scan and Cyclic Methods Applied to Reversible, Irreversible, and Kinetic Systems, Analytical Chemistry, vol. 36, No. 4, Apr. 1964, pp. 706-723.

Noda, Ikeda, Yamamoto, Einaga, and Ito; Kinetics of Electrochemical Reduction of Carbon Dioxide on a Gold Electrode in Phosphate Buffer Solutions; Bull. Chem. Soc. Jpn., 68, 1889-1895 (1995).

Joseph W. Ochterski, Thermochemistry in Gaussian, (c)2000, Gaussian, Inc., Jun. 2, 2000, 19 Pages.

Kotaro Ogura and Mitsugu Takagi, Electrocatalytic Reduction of Carbon Dioxide to Methanol, Part IV. Assessment of the Current-Potential Curves Leading to Reduction, J. Electroanal. Chem., 206 (1986) 209-216, Elsevier Sequoia S.A., Lausanne—Printed in The Netherlands.

Ohkawa, Noguchi, Nakayama, Hashimoto, and Fujishima; Electrochemical reduction of carbon dioxide on hydrogen-storing materials, Part 3. The effect of the absorption of hydrogen on the palladium electrodes modified with copper; Journal of Electroanalytical Chemistry, 367 (1994) 165-173.

Ohmstead and Nicholson, Cyclic Voltammetry Theory for the Disproportionation Reaction and Spherical Diffusion, Analytical Chemistry, vol. 41, No. 6, May 1969, pp. 862-864.

Shunichi Fukuzumi, Bioinspired Energy Conversion Systems for Hydrogen Production and Storage, Eur. J. Inorg. Chem. 2008, 1339-1345.

Angamuthu, Byers, Lutz, Spek, and Bouwman; Electrocatalytic CO2 Conversion to Oxalate by a Copper Complex, Science, vol. 327, Jan. 15, 2010, pp. 313-315.

J. Fischer, Th. Lehmann, and E. Heitz; The production of oxalic acid from C02 and H2O, Journal of Applied Electrochemistry 11 (1981) 743-750.

Rosenthal, Bachman, Dempsey, Esswein, Gray, Hodgkiss, Manke, Luckett, Pistorio, Veige, and Nocera; Oxygen and hydrogen photocatalysis by two-electron mixed-valence coordination compounds, Coordination Chemistry Reviews 249 (2005) 1316-1326.

Rudolph, Dautz, and Jager; Macrocyclic [N42-] Coordinated Nickel Complexes as Catalysts for the Formation of Oxalate by Electrochemical Reduction of Carbon Dioxide, J. Am. Chem. Soc. 2000, 122, 10821-10830.

D.A. Shirley, High-Resolution X-Ray Photoemission Spectrum of the Valence Bands of Gold, Physical Review B, vol. 5, No. 12, Jun. 15, 1972, pp. 4709-4714.

S.G. Sun and J. Clavilier, The Mechanism of Electrocatalytic Oxidation of Formic Acid on Pt (100) and Pt (111) in Sulphuric Acid Solution: An Emirs Study, J. Electroanal. Chem., 240 (1988) 147-159, Elsevier Sequoia S.A., Lausanne—Printed in The Netherlands.

(56) References Cited

OTHER PUBLICATIONS

Sun, Lin, Li, and Mu; Kinetics of dissociative adsorption of formic acid on Pt(100), Pt(610), Pt(210), and Pt(110) single-crystal electrodes in perchloric acid solutions, Journal of Electroanalytical Chemistry, 370 (1994) 273-280.

Marek Szklarczyk, Jerzy Sobkowski and Jolanta Pacocha, Adsorption and Reduction of Formic Acid on p-Type Silicon Electrodes, J. Electroanal. Chem., 215 (1986) 307-316, Elsevier Sequoia S.A., Lausanne—Printed in The Netherlands.

Zhao, Fan, and Wang, Photo-catalytic CO2 reduction using sol-gel derived titania-supported zinc-phthalocyanine, Journal of Cleaner Production 15 (2007) 1894-1897.

Tanaka and Ooyama, Multi-electron reduction of CO2 via Ru-CO2, -C(O)OH, -CO, -CHO, and -CH2OH species, Coordination Chemistry Reviews 226 (2002) 211-218.

Toyohara, Nagao, Mizukawa, and Tanaka, Ruthenium Formyl Complexes as the Branch Point in Two- and Multi-Electron Reductions of CO2, Inorg. Chem. 1995, 34, 5399-5400.

Watanabe, Shibata, and Kato; Design of Ally Electrocatalysts for CO2 Reduction, III. The Selective and Reversible Reduction of CO2 on Cu Alloy Electrodes; J. Electrochem. Soc., vol. 138, No. 11, Nov. 1991, pp. 3382-3389.

Dr. Chao Lin, Electrode Surface Modification and its Application to Electrocatalysis, V. Catalytic Reduction of Carbon Dioxide to Methanol, Thesis, 1992, Princeton University, pp. 157-179.

Dr. Gayatri Seshadri, Part I. Electrocatalysis at modified semiconductor and metal electrodes; Part II. Electrochemistry of nickel and cadmium hexacyanoferrates, Chapter 2—The Electrocatalytic Reduction of CO2 to Methanol at Low Overpotentials, 1994, Princeton University, pp. 52-85.

Cook, MacDuff, and Sammells; High Rate Gas Phase CO2 Reduction to Ethylene and Methane Using Gas Diffusion Electrodes, J. Electrochem. Soc., vol. 137, No. 2, pp. 607-608, Feb. 1990, © The Electrochemical Society, Inc.

Daube, Harrison, Mallouk, Ricco, Chao, Wrighton, Hendrickson, and Drube; Electrode-Confined Catalyst Systems for Use in Optical-to-Chemical Energy Conversion; Journal of Photochemistry, vol. 29, 1985, pp. 71-88.

Dewulf, Jin, and Bard; Electrochemical and Surface Studies of Carbon Dioxide Reduction to Methane and Ethylene at Copper Electrodes in Aqueous Solutions; J. Electrochem. Soc., vol. 136, No. 6, Jun. 1989, pp. 1686-1691, © The Electrochemical Society, Inc.

J. Augustynski, P. Kedzierzawski, and B. Jermann, Electrochemical Reduction of CO2 at Metallic Electrodes, Studies in Surface Science and Catalysis, vol. 114, pp. 107-116, © 1998 Elsevier Science B.V.

Sung-Woo Lee, Jea-Keun Lee, Kyoung-Hag Lee, and Jun-Heok Lim, Electrochemical reduction of CO and H2 from carbon dioxide in aqua-solution, Current Applied Physics, vol. 10, 2010, pp. S51-S54.

Andrew P. Abbott and Christopher A. Eardley, Electrochemical Reduction of CO2 in a Mixed Supercritical Fluid, J. Phys. Chem. B, 2000, vol. 104, pp. 775-779.

Matthew R. Hudson, Electrochemical Reduction of Carbon Dioxide, Dec. 9, 2005, pp. 1-15.

S. Kapusta and N. Hackerman, The Electroreduction of Carbon Dioxide and Formic Acid on Tin and Indium Electrodes, J. Electrochem. Soc.: Electrochemical Science and Technology, Mar. 1983, pp. 607-613.

M Aulice Scibioh and B Viswanathan, Electrochemical Reduction of Carbon Dioxide: A Status Report, Proc Indian Natn Sci Acad, vol. 70, A, No. 3, May 2004, pp. 1-56.

N. L. Weinberg, D. J. Mazur, Electrochemical hydrodimerization of formaldehyde to ethylene glycol, Journal of Applied Electrochemistry, vol. 21, 1991, pp. 895-901.

R.P.S. Chaplin and A.A. Wragg, Effects of process conditions and electrode material on reaction pathways for carbon dioxide electroreduction with particular reference to formate formation, Journal of Applied Electrochemistry vol. 33, pp. 1107-1123, 2003, © 2003 Kluwer Academic Publishers. Printed in the Netherlands.

M.N. Mahmood, D. Masheder, and C.J. Harty, Use of gas-diffusion electrodes for high-rate electrochemical reduction of carbon dioxide. I. Reduction at lead, indium- and tin-impregnated electrodes, Journal of Applied Electrochemistry, vol. 17, 1987, pp. 1159-1170.

Summers, Leach, and Frese, The Electrochemical Reduction of Aqueous Carbon Dioxide to Methanol at Molybdenum Electrodes with Low Overpotentials, J. Electroanal. Chem., vol. 205, 1986, pp. 219-232, Elseiver Sequoia S.A., Lausanne—Printed in The Netherlands.

Frese and Leach, Electrochemical Reduction of Carbon Dioxide to Methane, Methanol, and CO on Ru Electrodes, Journal of the Electrochemical Society, Jan. 1985, pp. 259-260.

Frese and Canfield, Reduction of CO2 on n-GaAs Electrodes and Selective Methanol Synthesis, J. Electrochem. Soc.: Electrochemical Science and Technology, vol. 131, No. 11, Nov. 1984, pp. 2518-2522.

Shibata, Yoshida, and Furuya, Electrochemical Synthesis of Urea at Gas-Diffusion Electrodes, J. Electrochem. Soc., vol. 145, No. 2, Feb. 1998, © The Electrochemical Society, Inc., pp. 595-600.

Shibata and Furuya, Simultaneous reduction of carbon dioxide and nitrate ions at gas-diffusion electrodes with various metallophthalocyanine catalysts, Electrochimica Acta 48, 2003, pp. 3953-3958.

M. Gattrell, N. Gupta, and A. Co, A Review of the aqueous electrochemical reduction of CO2 to hydrocarbons at copper, Journal of Electroanalytical Chemistry, vol. 594, 2006, pp. 1-19.

Mahmood, Masheder, and Harty; Use of Gas-Diffusion Electrodes for High-Rate Electrochemical Reduction of Carbon Dioxide. II. Reduction at Metal Phthalocyanine-impregnated Electrodes; Journal of Applied Electrochemistry, vol. 17, 1987, pp. 1223-1227.

Gennaro, Isse, Saveant, Severin, and Vianello; Homogeneous Electron Transfer Catalysis of the Electrochemical Reduction of Carbon Dioxide. Do Aromatic Anion Radicals React in an Outer-Sphere Manner?; J. Am. Chem. Soc., 1996, vol. 118, pp. 7190-7196.

J. Giner, Electrochemical Reduction of CO2 on Platinum Electrodes in Acid Solutions, Electrochimica Acta, 1963, vol. 8, pp. 857-865, Pregamon Press Ltd., Printed in Northern Ireland.

John Leonard Haan, Electrochemistry of Formic Acid and Carbon Dioxide on Metal Electrodes with Applications to Fuel Cells and Carbon Dioxide Conversion Devices, 2010, pp. 1-205.

M. Halmann, Photoelectrochemical reduction of aqueous carbon dioxide on p-type gallium phosphide in liquid junction solar cells, Nature, vol. 275, Sep. 14, 1978, pp. 115-116.

H. Ezaki, M. Morinaga, and S. Watanabe, Hydrogen Overpotential for Transition Metals and Alloys, and its Interpretation Using an Electronic Model, Electrochimica Acta, vol. 38, No. 4, 1993, pp. 557-564, Pergamon Press Ltd., Printed in Great Britain.

K.S. Udupa, G.S. Subramanian, and H.V.K. Udupa, The Electrolytic Reduction of Carbon Dioxide to Formic Acid, Electrochimica Acta, 1971, vol. 16, pp. 1593-1598, Pergamon Press., Printed in Northern Ireland.

Ougitani, Aizawa, Sonoyama, and Sakata; Temperature Dependence of the Probability of Chain Growth for Hydrocarbon Formation by Electrochemical Reduction of CO2, Bull. Chem. Soc. Jpn., vol. 74, pp. 2119-2122, 2001.

Furuya, Yamazaki, and Shibata; High performance Ru-Pd catalysts for CO2 reduction at gas-diffusion electrodes, Journal of Electroanalytical Chemistry, vol. 431, 1997, pp. 39-41.

R. Hinogami, Y. Nakamura, S. Yae, and Y. Nakato; An Approach to Ideal Semiconductor Electrodes for Efficient Photoelectrochemical Reduction of Carbon Dioxide by Modification with Small Metal Particles, J. Phys. Chem. B, 1998, vol. 102, pp. 974-980.

Reda, Plugge, Abram, and Hirst; Reversible interconversion of carbon dioxide and formate by an electroactive enzyme, PNAS, Aug. 5, 2008, vol. 105, No. 31, pp. 10654-10658, www.pnas.org/cgi/doi/10.1073pnas.0801290105.

Hori, Yoshio; Suzuki, Shin, Cathodic Reduction of Carbon Dioxide for Energy Storage, Journal of the Research Institute for Catalysis Hokkaido University, 30(2): 81-88, 1983-02, http://hdl.handle.net/2115/25131.

Hori, Wakebe, Tsukamoto, and Koga; Electrocatalytic Process of CO Selectivity in Electrochemical Reduction of CO2 at Metal Electrodes in Aqueous Media, Electrochimica Acta, vol. 39, No. 11/12, pp. 1833-1839, 1994, Copyright 1994 Elsevier Science Ltd., Pergamon, Printed in Great Britain.

(56) References Cited

OTHER PUBLICATIONS

Hori, Kikuchi, and Suzuki; Production of CO and CH4 in Electrochemical Reduction of CO2 at Metal Electrodes in Aqueous Hydrogencarbonate Solution; Chemistry Letters, 1985, pp. 1695-1698, Copyright 1985 The Chemical Society of Japan.

Hori, Kikuchi, Murata, and Suzuki; Production of Methane and Ethylene in Electrochemical Reduction of Carbon Dioxide at Copper Electrode in Aqueous Hydrogencarbonate Solution; Chemistry Letters, 1986, pp. 897-898, Copyright 1986 The Chemical Society of Japan.

Hoshi, Suzuki, and Hori; Step Density Dependence of CO2 Reduction Rate on Pt(S)–[n(111)×(111)] Single Crystal Electrodes, Electrochimica Acta, vol. 41, No. 10, pp. 1617-1653, 1996, Copyright 1996 Elsevier Science Ltd. Printed in Great Britain.

Hoshi, Suzuki, and Hori; Catalytic Activity of CO2 Reduction on Pt Single-Crystal Electrodes: Pt(S)–[n(111)×(111)], Pt(S)–[n(111)×(100)], and Pt(S)–[n(100)×(111)], J. Phys. Chem. B, 1997, vol. 101, pp. 8520-8524.

Ikeda, Saito, Yoshida, Noda, Maeda, and Ito; Photoelectrochemical reduction products of carbon dioxide at metal coated p-GaP photocathodes in non-aqueous electrolytes, J. Electroanal. Chem., 260 (1989) pp. 335-345, Elsevier Sequoia S.A., Lausanne—Printed in The Netherlands.

Noda, Ikeda, Oda, Imai, Maeda, and Ito; Electrochemical Reduction of Carbon Dioxide at Various Metal Electrodes in Aqueous Potassium Hydrogen Carbonate Solution, Bull. Chem. Soc. Jpn., 63, pp. 2459-2462, 1990, Copyright 1990 The Chemical Society of Japan.

S.R. Narayanan, B. Haines, J. Soler, and T.I. Valdez; Electrochemical Conversion of Carbon Dioxide to Formate in Alkaline Polymer Electrolyte Membrane Cells, Journal of the Electrochemical Society, 158 (2) A167-A173 (2011).

Tooru Inoue, Photoelectrocatalytic reduction of carbon dioxide in aqueous suspensions of semiconductor powders, Nature, vol. 277, Feb. 22, 1979, pp. 637-638.

B. Jermann and J. Augustynski, Long-Term Activation of the Copper Cathode in the Course of CO2 Reduction, Electrochimica Acta, vol. 39, No. 11/12, pp. 1891-1896, 1994, Elsevier Science Ltd., Printed in Great Britain.

Jitaru, Lowy, M. Toma, B.C. Toma, and L. Oniciu; Electrochemical reduction of carbon dioxide on flat metallic cathodes; Journal of Applied Electrochemistry 27 (1997) 875-889, Reviews in Applied Electrochemistry No. 45.

Maria Jitaru, Electrochemical Carbon Dioxide Reduction-Fundamental and Applied Topics (Review), Journal of the University of Chemical Technology and Metallurgy, 42, 4, 2007, 333-344.

Kaneco, Katsumata, Suzuki, and Ohta; Photoelectrocatalytic reduction of CO2 in LiOH/methanol at metal-modified p-InP electrodes, Applied Catalysis B: Environmental 64 (2006) 139-145.

J. J. Kim, D.P. Summers, and K.W. Frese, Jr; Reduction of CO2 and CO to Methane on Cu Foil Electrodes, J. Electroanal. Chem., 245 (1988) 223-244, Elsevier Sequoia S.A., Lausanne—Printed in The Netherlands.

Osamu Koga and Yoshio Hori, Reduction of Adsorbed Co on a Ni Electrode in Connection With the Electrochemical Reduction of CO2, Electrochimica Acta, vol. 38, No. 10, pp. 1391-1394,1993, Printed in Great Britain.

Breedlove, Ferrence, Washington, and Kubiak; A photoelectrochemical approach to splitting carbon dioxide for a manned mission to Mars, Materials and Design 22 (2001) 577-584, © 2001 Elsevier Science Ltd.

Simon-Manso and Kubiak, Dinuclear Nickel Complexes as Catalysts for Electrochemical Reduction of Carbon Dioxide, Organometallics 2005, 24, pp. 96-102, © 2005 American Chemical Society.

Kushi, Nagao, Nishioka, Isobe, and Tanaka; Remarkable Decrease in Overpotential of Oxalate Formation in Electrochemical C02 Reduction by a Metal-Sulfide Cluster, J. Chem. Soc., Chem. Commun., 1995, pp. 1223-1224.

Kuwabata, Nishida, Tsuda, Inoue, and Yoneyama; Photochemical Reduction of Carbon Dioxide to Methanol Using ZnS Microcrystallite as a Photocatalyst in the Presence of Methanol Dehydrogenase, J. Electrochem. Soc., vol. 141, No. 6, pp. 1498-1503, Jun. 1994, © The Electrochemical Society, Inc.

Nara et al., "Electrochemical Reduction of Carbon Dioxide Under High Pressure on Various Electrodes in an Aqueous Electrolyte", Journal of Electroanalytical Chemistry (no month, 1995), vol. 391, pp. 141-147.

Yamamoto et al., "Production of Syngas Plus Oxygen From CO2 in a Gas-Diffusion Electrode-Based Electrolytic Cell", Electrochimica Acta (no month, 2002), vol. 47, pp. 3327-3334.

Seshadri et al., "A New Homogeneous Electrocatalyst for the Reduction of Carbon Dioxide to Menthanol at Low Overpotential", Journal of Electroanalytical Chemistry, 372 pp. 145-150, Jul. 8, 1994, figure 1; p. 146-147.

Doherty, "Electrochemical Reduction of Butyraldehyde in the Presence of CO2", Electrochimica Acta 47(2002) 2963-2967.

Udupa et al., "The Electrolytic Reduction of Carbon Dioxide to Formic Acid", Electrochimica Acta (no month, 1971), vol. 16, pp. 1593-1598.

Jitaru, Maria, "Electrochemical Carbon Dioxide Reduction'"Fundamental and Applied Topics (Review), Journal of the University of Chemical Technology and Metallurgy (2007), vol. 42, No. 4, pp. 333-344.

Sloop et al., "The Role of Li-ion Battery Electrolyte Reactivity in Performance Decline and Self-Discharge", Journal of Power Sources (no month, 2003), vols. 119-121, pp. 330-337.

Shibata, Masami, et al., "Electrochemical Synthesis of Urea at Gas-Diffusion Electrodes", J. Electrochem. Soc., vol. 145, No. 2, Feb. 1998, pp. 595-600, The Electrochemical Society, Inc.

Shibata, Masami, et al., "Simultaneous Reduction of Carbon Dioxide and Nitrate Ions at Gas-Diffusion Electrodes with Various Metallophthalocyanine Catalysts", From a paper presented at the 4th International Conference on Electrocatalysis: From Theory to Industrial Applications', Sep. 22-25, 2002, Como, Italy, Electrochimica Acta 48 (2003) 3959-3958.

Harrison et al., "The Electrochemical Reduction of Organic Acids", Electroanalytical Chemistry and Interfacial Electrochemistry (no month, 1971), vol. 32, No. 1, pp. 125-135.

Chauhan et al., "Electro Reduction of Acetophenone in Pyridine on a D.M.E.", J Inst. Chemists (India) [Jul. 1983], vol. 55, No. 4, pp. 147-148.

Hori et al, chapter on "Electrochemical CO2 Reduction on Metal Electrodes," in the book Modern Aspects of Electrochemistry, vol. 42, pp. 106 and 107.

Czerwinski et al, "Adsorption Study of CO2 on Reticulated Vitreous Carbon (RVC) covered with Platinum," Analytical Letters, vol. 18, Issue 14 (1985), pp. 1717-1722.

Jitaru, Lowy, Toma, Toma and Oniciu, "Electrochemical Reduction of Carbon Dioxide on Flat Metallic Cathodes," Journal of Applied Electrochemistry, 1997, vol. 27, p. 876.

Popic, Avramov, and Vukovic, "Reduction of Carbon Dioxide on Ruthenium Oxide and Modified Ruthenium Oxide Electrodes in 0.5M NaHCO3," Journal of Electroanalytical Chemistry, 1997, vol. 421, pp. 105-110.

Eggins and McNeill, "Voltammetry of Carbon Dioxide. I. A General Survey of Voltammetry at Different Electrode Materials in Different Solvents," Journal of Electroanalytical Chemistry, 1983, vol. 148, pp. 17-24.

Kostecki and Augustynski, "Electrochemical Reduction of CO2 at an Active Silver Electrode," Ber. Busenges. Phys. Chem., 1994, vol. 98, pp. 1510-1515.

Non-Final Office Action for U.S. Appl. No. 12/486,221, dated Nov. 12, 2012.

Non-Final Office Action for U.S. Appl. No. 12/486,011, dated Aug. 29, 2012.

Non-Final Office Action for U.S. Appl. No. 12/486,002, dated Sep. 11, 2012.

Non-Final Office Action for U.S. Appl. No. 12/845,995, dated Aug. 13, 2012.

Final Office Action for U.S. Appl. No. 12/845,995, dated Nov. 28, 2012.

Non-Final Office Action for U.S. Appl. No. 12/696,840, dated Jul. 9, 2012.

(56) References Cited

OTHER PUBLICATIONS

Non-Final Office Action for U.S. Appl. No. 13/472,039, dated Sep. 13, 2012.

DNV (Det Norske Veritas), Carbon Dioxide Utilization, Electrochemical Conversion of CO2—Opportunities and Challenges, Research and Innovation, Position Paper, Jul. 2011.

Matthew R. Hudson, Electrochemical Reduction of Carbon Dioxide, Department of Chemistry, State University of New York at Potsdam, Potsdam New York 13676, pp. 1-15, Dec. 9, 2005.

Colin Oloman and Hui Li, Electrochemical Processing of Carbon Dioxide, ChemSusChem 2008, 1, 385-391, (c) 2008 Wiley-VCH Verlag GmbH& Co. KGaA, Weinheim, www.chemsuschem.org.

R.P.S. Chaplin and A.A. Wragg; Effects of Process Conditions and Electrode Material on Reaction Pathways for Carbon Dioxide Electroreduction with Particular Reference to Formate Formation; Journal of Applied Electrochemistry 33: pp. 1107-1123, 2003; © 2003 Kluwer Academic Publishers. Printed in the Netherlands.

Akahori, Iwanaga, Kato, Hamamoto, Ishii; New Electrochemical Process for CO2 Reduction to from Formic Acid from Combustion Flue Gases; Electrochemistry; vol. 4; pp. 266-270.

Ali, Sato, Mizukawa, Tsuge, Haga, Tanaka; Selective formation of HCO2- and C2O42—in electrochemical reduction of CO2 catalyzed by mono- and di-nuclear ruthenium complexes; Chemistry Communication; 1998; 7/07363A; pp. 249-250.

Wang, Maeda, Thomas, Takanabe, Xin, Carlsson, Domen, Antonietti; A metal-free polymeric photocatalyst for hydrogen production from water under visible light; Nature Materials; Published Online Nov. 9, 2008; www.nature.com/naturematerials; pp. 1-5.

Aresta and Dibenedetto; Utilisation of CO2 as a Chemical Feedstock: Opportunities and Challenges; Dalton Transactions; 2007; pp. 2975-2992; © The Royal Society of Chemistry 2007.

B. Aurian-Blajeni, I. Taniguchi, and J. O'M. Bockris; Photoelectrochemical Reduction of Carbon Dioxide Using Polyaniline-Coated Silicon; J. Electroanal. Chem.; vol. 149; 1983; pp. 291-293; Elsevier Sequoia S.A., Lausanne, Printed in The Netherlands.

Azuma, Hashimoto, Hiramoto, Watanabe, Sakata; Electrochemical Reduction of Carbon Dioxide on Various Metal Electrodes in Low-Temperature Aqueous KHCO3 Media; J. Electrochem. Soc., vol. 137, No. 6, Jun. 1990 © The Electrochemical Society, Inc.

Bandi and Kuhne; Electrochemical Reduction of Carbon Dioxide in Water: Analysis of Reaction Mechanism on Ruthenium—Titanium—Oxide; J. Electrochem. Soc., vol. 139, No. 6, Jun. 1992 © The Electrochemical Society, Inc.

Beley, Collin, Sauvage, Petit, Chartier; Photoassisted Electro-Reduction of CO2 on p-GaAs in the Presence of Ni Cyclam; J. Electroanal. Chem. vol. 206, 1986, pp. 333-339, Elsevier Sequoia S.A., Lausanne, Printed in The Netherlands.

Benson, Kubiak, Sathrum, and Smieja; Electrocatalytic and homogeneous approaches to conversion of CO2 to liquid fuels; Chem. Soc. Rev., 2009, vol. 38, pp. 89-99, © The Royal Society of Chemistry 2009.

Taniguchi, Adrian-Blajeni, and Bockris; The Mediation of the Photoelectrochemical Reduction of Carbon Dioxide by Ammonium Ions; J. Electroanal. Chem., vol. 161, 1984, pp. 385-388, Elsevier Sequoia S.A., Lausanne—Printed in The Netherlands.

Bockris and Wass; The Photoelectrocatalytic Reduction of Carbon Dioxide; J. Electrochem. Soc., vol. 136, No. 9, Sep. 1989, pp. 2521-2528, © The Electrochemical Society, Inc.

Carlos R. Cabrera and Hector D. Abruna; Electrocatalysis of CO2 Reduction at Surface Modified Metallic and Semiconducting Electrodes; J. Electroanal. Chem. vol. 209, 1986, pp. 101-107, Elsevier Sequoia S.A., Lausanne—Printed in The Netherlands, © 1986 Elsevier Sequoia S.A.

D. Canfield and K.W. Frese, Jr.; Reduction of Carbon Dioxide to Methanol on n-and p-GaAs and p-InP. Effect of Crystal Face, Electrolyte and Current Density; Journal of the Electrochemical Society; Aug. 1983; pp. 1772-1773.

Huang, Lu, Zhao, Li, and Wang; The Catalytic Role of N-Heterocyclic Carbene in a Metal-Free Conversion of Carbon Dioxide into Methanol: A Computational Mechanism Study; J. Am. Chem. Soc. 2010, vol. 132, pp. 12388-12396, © 2010 American Chemical Society.

Arakawa, et al., Catalysis Research of Relevance to Carbon Management: Progress, Challenges, and Opportunities; Chem. Rev. 2001, vol. 101, pp. 953-996.

Cheng, Blaine, Hill, and Mann; Electrochemical and IR Spectroelectrochemical Studies of the Electrocatalytic Reduction of Carbon Dioxide by [Ir2(dimen)4]2+ (dimen=1,8-Diisocyanomenthane), Inorg. Chem. 1996, vol. 35, pp. 7704-7708, © 1996 American Chemical Society.

Stephen K. Ritter; What Can We Do With Carbon Dioxide?, Chemical & Engineering News, Apr. 30, 2007, vol. 85, No. 18, pp. 11-17, http://pubs.acs.org/cen/coverstory/85/8518cover.html.

J. Beck, R. Johnson, and T. Naya; Electrochemical Conversion of Carbon Dioxide to Hydrocarbon Fuels, EME 580 Spring 2010, pp. 1-42.

Aydin and Koleli, Electrochemical reduction of CO2 on a polyaniline electrode under ambient conditions and at high pressure in methanol, Journal of Electroanalytical Chemistry vol. 535 (2002) pp. 107-112, www.elsevier.com/locate/jelechem.

Lee, Kwon, Machunda, and Lee; Electrocatalytic Recycling of CO2 and Small Organic Molecules; Chem. Asian J. 2009, vol. 4, pp. 1516-1523, © 2009 Wiley-VCH Verlag GmbH&Co. KGaA, Weinheim.

Etsuko Fujita, Photochemical CO2 Reduction: Current Status and Future Prospects, American Chemical Society's New York Section, Jan. 15, 2011, pp. 1-29.

Toshio Tanaka, Molecular Orbital Studies on the Two-Electron Reduction of Carbon Dioxide to Give Formate Anion, Memiors of Fukui University of Technology, vol. 23, Part 1, 1993, pp. 223-230.

A. Bewick and G.P. Greener, The Electroreduction of CO2 to Glycollate on a Lead Cathode, Tetrahedron Letters No. 5, pp. 391-394, 1970, Pergamon Press, Printed in Great Britain.

Centi, Perathoner, Wine, and Gangeri, Electrocatalytic conversion of CO2 to long carbon-chain hydrocarbons, Green Chem., 2007, vol. 9, pp. 671-678, © The Royal Society of Chemistry 2007.

A. Bewick and G.P. Greener, The Electroreduction of CO2 to Malate on a Mercury Cathode, Tetrahedron Letters No. 53, pp. 4623-4626, 1969, Pergamon Press, Printed in Great Britain.

Eggins, Brown, McNeill, and Grimshaw, Carbon Dioxide Fixation by Electrochemical Reduction in Water to Oxalate and Glyoxylate, Tetrahedron Letters vol. 29, No. 8, pp. 945-948, 1988, Pergamon Journals Ltd., Printed in Great Britain.

Seshadri et al, "A new homogeneous catalyst for the reduction of carbon dioxide to methanol at low overpotential," Journal of Electroanalytical Chemistry, 372 (1994) 145-150.

Scibioh et al, "Electrochemical Reductin of Carbon Dioxide: A Status Report," Proc. Indian Natn Science Acad., 70, A, No. 3, May 2004, pp. 407-762.

Fukaya et al., "Electrochemical Reduction of Carbon Dioxide to Formate Catalyzed by Rh(bpy)3Cl3", Kagaku Gijutsu Kenkyusho Hokoku (no month, 1986), vol. 81, No. 5, pp. 255-258. 1-page abstract only.

Li et al., "The Electro-Reduction of Carbon Dioxide in a Continuous Reactor", J. of Applied Electrochemistry (no month, 2005), vol. 35, pp. 955-965.

Kaneco et al., "Electrochemical Reduction of Carbon Dioxide to Ethylene with High Faradaic Efficiency at a Cu Electrode in CsOH/ Methanol", Electrochimica Acta (no month, 1999), vol. 44, pp. 4701-4706.

Kaneco et al., "Electrochemical Conversion of Carbon Dioxide to Formic Acid on Pb in KOH/Methanol Electrolyte at Ambient Temperature and Pressure", Energy (no month, 1998), vol. 23, No. 12, pp. 1107-1112.

Yuan et al., "Electrochemical Activation of Carbon Dioxide for Synthesis of Dimethyl Carbonate in an Ionic Liquid", Electrochimica Acta (no month, 2009), vol. 54, pp. 2912-2915.

U.S. Appl. No. 13/724,647, filed Dec. 21, 2012; Office Action mailed Oct. 17, 2013.

U.S. Appl. No. 13/787,481, filed Mar. 6, 2013; Office Action mailed Sep. 13, 2013.

(56) References Cited

OTHER PUBLICATIONS

U.S. Appl. No. 13/724,082, filed Dec. 21, 2012; Office Action mailed Aug. 12, 2013.
U.S. Appl. No. 13/724,522, filed Dec. 21, 2012; Office Action mailed Oct. 1, 2013.
U.S. Appl. No. 13/724,885, filed Dec. 21, 2012; Office Action mailed Aug. 21, 2013.
U.S. Appl. No. 13/724,231, filed Dec. 21, 2012; Office Action mailed Aug. 20, 2013.
Seshadri et al., "A new homogeneous electrocatalyst for the reduction of carbon dioxide to methanol at low overpotential", Journal of Electroanalytical Chemistry and Interfacial Electro Chemistry, Elsevier, Amsterdam, NL, vol. 372, No. 1-2, Jul. 8, 1994, pp. 145-150.
Hossain et al., "Palladium and cobalt complexes of substituted quinoline, bipyridine and phenanthroline as catalysts for electrochemical reduction of carbon dioxide", Electrochimica Acta, Elsevier Science Publishers, vol. 42, No. 16, Jan. 1, 1997, pp. 2577-2585.
Fisher et al., "Electrocatalytic reduction of carbon dioxide by using macrocycles of nickel and cobalt", Journal of the American Chemical Society, vol. 102, No. 24, Sep. 1, 1980, pp. 7361-7363.
Ishida et al., Selective Formation of HC00—In the Electrochemical CO2 Reduction Catalyzed by URU(BPY)2(CO)2 3/42-+ (BPY=2,2'-Bipyridine), Journal of the Chemical Society, Chemical Communications, Chemical Society, Letchworth, GB, Jan. 1, 1987, pp. 131-132.
Zhao et al., "Electrochemical reduction of supercritical carbon dioxide in ionic liquid 1-n-butyl-3-methylimidazolium hexafluorophosphate", Journal of Supercritical Fluids, PRA Press, US, vol. 32, No. 1-3, Dec. 1, 2004, pp. 287-291.
Seshardi G., Lin C., Bocarsly A.B., A new homogeneous electrocatalyst for the reduction of carbon dioxide to methanol at low overpotential, Journal of Electroanalytical Chemistry, 1994, 372, pp. 145-150.
Seshadri et al., A New Homogeneous Electrocatalyst for the Reduction of Carbon Dioxide to Methanol at Low Overpotential, Journal of Electroanalytical Chemistry, 372 (1994), 145-50.
Green et al., Vapor-Liquid Equilibria of Formaldehyde-Methanol-Water, Industrial and Engineering Chemistry (Jan. 1955), vol. 47, No. 1, pp. 103-109.
Scibioh et al., Electrochemical Reduction of Carbon Dioxide: A Status Report, Proc Indian Natn Sci Acad (May 2004), vol. 70, A, No. 3, pp. 407-462.
Gennaro et al., Homogeneous Electron Transfer Catalysis of the Electrochemical Reduction of Carbon Dioxide. Do Aromatic Anion Radicals React in an Outer-Sphere Manner?, J. Am. Chem. Soc. (no month, 1996), vol. 118, pp. 7190-7196.
Perez et al., Activation of Carbon Dioxide by Bicyclic Amidines, J. Org. Chem. (no month, 2004), vol. 69, pp. 8005-8011.
Zaragoza Dorwald, Side Reactions in Organic Synthesis, 2005, Wiley-VCH Verlag GmbH & Co. KGaA, Weinheim, Preface. p. IX.
Liansheng et al, Journal of South Central University Technology, Electrode Selection of Electrolysis with Membrane for Sodium Tungstate Solution, 1999, 6(2), pp. 107-110.
Mahmood et al., Use of Gas-Diffusion Electrodes for High-Rate Electrochemical Reduction of Carbon Dioxide. II. Reduction at Metal Phthalocyanine-Impregnated Electrodes, J. of Appl. Electrochem. (no month, 1987), vol. 17, pp. 1223-1227.
Tanno et al., Electrolysis of Iodine Solution in a New Sodium Bicarbonate-Iodine Hybrid Cycle, International Journal of Hydrogen Energy (no month, 1984), vol. 9, No. 10, pp. 841-848.
Shibata et al., "Simultaneous Reduction of Carbon Dioxide and Nitrate Ions at Gas-Diffusion Electrodes with Various Metallophthalocyanine Catalysts", Electrochima Acta (no month, 2003), vol. 48, pp. 3953-3958.
Scibioh et al., "Electrochemical Reduction of Carbon Dioxide: A Status Report", Proc Indian Natn Sci Acad (May 2004), vol. 70, A, No. 3, pp. 407-462.
Shibata et al., "Electrochemical Synthesis of Urea at Gas-Diffusion Electrodes", J. Electrochem. Soc. (Jul. 1998), vol. 145, No. 7, pp. 2348-2353.
Non-Final Office Action for U.S. Appl. No. 12/875,227, dated Dec. 11, 2012.

\* cited by examiner

CONVERSION OF CARBON DIOXIDE TO ORGANIC PRODUCTS

CROSS REFERENCES TO RELATED APPLICATIONS

This application claims priority to U.S. Provisional Application No. 61/206,286 filed on Jan. 29, 2009, which is hereby incorporated by reference.

The present application claims priority to U.S. patent application Ser. No. 12/696,840, filed Jan. 29, 2010. The present application herein incorporates U.S. patent application Ser. No. 12/696,840 in its entirety.

STATEMENT OF GOVERNMENT SUPPORT

This invention was made with United States government support from National Science Foundation Grant No. CHE-0616475. The United States Government has certain rights in this invention.

INTRODUCTION

In recent years, high levels of atmospheric carbon dioxide ($CO_2$), emitted, for example, from industry, fossil fuel combustion and utilities, have been linked to global climate change. A greenhouse effect attributed to carbon dioxide is indicated as one cause of the warming phenomenon of the earth. Many responsible sources contend that the condition of the earth's atmosphere is such that, to avoid the predicted dire consequences of global warming effects, removal of a portion of the existing, as well as new, quantities of carbon dioxide from the atmosphere is needed.

Various options for carbon dioxide reduction have been proposed. In addition to energy conservation, carbon capture and storage, the process of separating $CO_2$ from emission sources and transporting it to a storage location for long-term (indefinite) isolation, and carbon sequestration, the process of permanently storing $CO_2$ underground, have garnered the most attention to date. However, these technologies face significant challenges and are presently far from being cost effective. In addition, sequestration has raised serious environmental concern, legal and regulatory issues due to the unknown ramifications of permanently storing $CO_2$ underground.

A significant issue with the removal of carbon dioxide from the atmosphere is the very large energy input to overcome the entropic energies associated with isolating and concentrating a diffuse gas. As noted, current strategies for removal of carbon dioxide from the atmosphere are either inefficient, cost prohibitive, or produce toxic by-products such as chlorine. To lower global carbon dioxide levels and reduce new carbon dioxide emissions, it remains critical to develop economically feasible processes to remove vast quantities of carbon dioxide from the atmosphere or gas streams.

BRIEF DESCRIPTION

In accordance with embodiments of the invention, an electrocatalytic system is provided that allows carbon dioxide to be converted at very modest overpotentials to highly reduced species in aqueous solution, in other words, carbon-carbon and/or carbon-hydrogen bonds are formed in aqueous solution under very mild condition utilizing a minimum of energy. In some embodiments, the required energy input may be generated from an alternative energy source or directly using visible light depending on how the system is implemented.

In embodiments of the invention, the reduction of carbon dioxide is suitably catalyzed by aromatic heterocyclic amines, e.g., pyridinium, imidazole and their substituted derivatives. These simple organic compounds have been found to be effective and stable homogenous electrocatalysts and photoelectrocatalysts for the aqueous multiple electron, multiple proton reduction of carbon dioxide to organic products such as formic acid, formaldehyde, and methanol. For production of methanol, the reduction of carbon dioxide proceeds along 6 $e^-$ transfer pathway. High faradaic yields for the reduced products have been found in both electrochemical and photoelectrochemical systems at low reaction overpotentials.

It has previously been thought that metal-derived multi-electron transfer was necessary to achieve highly reduced products such as methanol. Surprisingly, the simple aromatic heterocyclic amine molecules in accordance with embodiments of the invention are capable of producing many different chemical species on route to methanol through multiple electron transfers instead of metal-based multi-electron transfer.

The invention thus relates to various embodiments of environmentally beneficial methods for reducing carbon dioxide. The methods in accordance with the invention include electrochemically or photoelectrochemically reducing the carbon dioxide in an aqueous, electrolyte-supported divided electrochemical cell that includes an anode, e.g., an inert metal counterelectrode, in one cell compartment and a metal or p-type semiconductor working cathode electrode in another cell compartment that contains a catalyst of one or more substituted or unsubstituted aromatic heterocyclic amines to produce a reduced organic product. $CO_2$ is continuously bubbled through the cathode electrolyte solution to saturate the solution.

For electrochemical reduction, the electrode may be chosen from any suitable metal electrode, such as Au, Ag, Zn, Pd, Ga, Hg, In, Cd, Ti and Pt. Pt and hydrogenated Pd have been found to be especially suitable. For photoelectrochemical reduction, the electrode may suitably be chosen from p-type semiconductors such as p-GaAs, p-GaP, p-InN, p-InP, p-CdTe, p-GaInP$_2$ and p-Si.

The catalyst for conversion of carbon dioxide electrochemically or photoelectrochemically may be selected from any substituted or unsubstituted aromatic heterocyclic amine. Suitable amines are heterocycles which are 5- or 6-member rings with at least one ring nitrogen. For example, pyridine, imidazole and their substituted derivatives have been found to be especially suitable as catalysts for either the electrochemical reduction or the photoelectrochemical reduction. It is also envisioned the other aromatic amine, e.g., quinolines, are also effective electrocatalyts.

BRIEF DESCRIPTION OF THE DRAWINGS

The invention may be better understood and appreciated by reference to the detailed description of specific embodiments presented herein in conjunction with the accompanying drawings of which.

DETAILED DESCRIPTION

Figure 1:
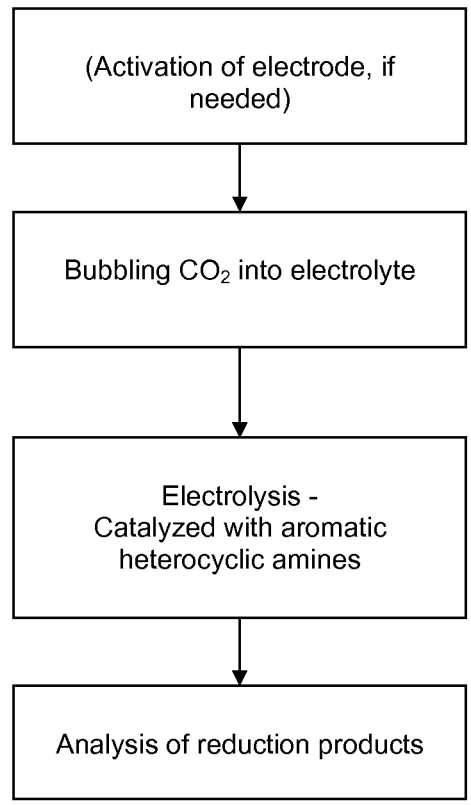
FIG. 1 is a flow chart for the electrochemical reduction of in accordance with embodiments of the invention.

Embodiments of the present invention relate to the simple, efficient, and economical conversion of carbon dioxide to reduced organic products, such as methanol, formic acid and formaldehyde.

It has been previously known that carbon dioxide can be photochemically or electrochemically reduced to formic acid with formaldehyde and methanol being formed in only smaller amounts. Catalytic hydrogenation of carbon dioxide using heterogeneous catalysts is also known to provide methanol together with water as well as formic acid and formaldehyde. Also known is the reduction of carbon dioxide to methanol with complex metal hydrides, such as lithium aluminum hydride, a process which is extremely costly, and therefore, not suited for the bulk production of methanol. Such known current processes are highly energy-consuming, and are not efficient ways for a high yield, economical conversion of carbon dioxide to organic products, e.g., methanol.

On the other hand, the use of processes for converting carbon dioxide to reduced organic products in accordance with embodiments of the invention has the potential to lead to a significant reduction of carbon dioxide, a major greenhouse gas, in the atmosphere, thus to mitigation of global warming. Moreover, the present invention advantageously produces methanol and related products without the need of adding extra reactants, such as a hydrogen source. The resultant product mixture requires little in the way of further treatment. For example, a resultant 1 M methanol solution may be used directly in a fuel cell. For other uses, simple removal of the electrolyte salt and water are readily accomplished.

Before any embodiments of the invention are explained in detail, it is to be understood that the invention is not limited in its application of the details of the structure or the function of the invention set forth in the following description or illustrated in the appended figures of the drawing. The invention is capable of other embodiments and of being practiced or carried out in various ways. Also, it is to be understood that the phraseology and terminology used herein is for the purpose of description and should not be regarded as limiting. The use of terms such as "including," "comprising," or "having" and variations thereof herein is meant to encompass the item listed thereafter and equivalents thereof as well as additional items. Further, unless otherwise noted, technical terms are used according to conventional usage.

Further, unless otherwise noted, technical terms are used according to conventional usage. Definitions of standard chemistry terms may be found in reference works, such as Carey and Sundberg "ADVANCED ORGANIC CHEMISTRY 4$^{th}$ ED." Vols. A (2000) and B (2001), Plenum Press, New York. Unless otherwise indicated, conventional methods of mass spectroscopy, NMR, spectrophotometry, and gas chromatography, within the skill of the art are employed. The nomenclature employed in connection with, and the laboratory procedures and techniques of, electrochemistry, analytical chemistry, and synthetic organic chemistry described herein are generally those known in the art. However, as used herein, the following definitions may he useful in aiding the skilled practitioner in understanding the invention.

An "alkyl" group refers to an aliphatic hydrocarbon group. The alkyl moiety may be a "saturated alkyl" group (i.e., no alkene or alkyne moieties), or an "unsaturated alkyl" moiety, which means that it contains at least one alkene or alkyne moiety. The alkyl moiety, whether saturated or unsaturated, may be branched, straight chain, or cyclic. Depending on the structure, an alkyl group can be a monoradical or a diradical (i.e., an alkylene group). As used herein, is the designation $C_1$-$C_x$, which includes $C_1$-$C_2$, $C_1$-$C_3$, $C_1$-$C_4$ . . . $C_1$-$C_{10}$ . . . $C_1$-$C_x$.

The "alkyl" moiety may have 1 to 30 carbon atoms (whenever it appears herein, a numerical range such as "1 to 30" refers to each integer in the given range; e.g., "1 to 30 carbon atoms" means that the alkyl group may have 1 carbon atom, 2 carbon atoms. 3 carbon atoms, etc., up to and including 30 carbon atoms, although the present definition also covers the occurrence of the term "alkyl" where no numerical range is designated). A "lower alkyl" moiety may have 1 to 10 carbons. For example, the lower alkyl group of the compounds described herein may be designated as "$C_1$-$C_{10}$ alkyl" or similar designations. By way of example only, "$C_1$-$C_{10}$ alkyl" includes $C_1$-$C_2$ alkyl, $C_1$-$C_3$ alkyl, $C_1$-$C_4$ . . . $C_1$-$C_{10}$ alkyl. Typical lower alkyl groups include, but are in no way limited to, methyl, ethyl, propyl, isopropyl, butyl, isobutyl, tertiary butyl, pentyl, hexyl, ethenyl, propenyl, butenyl, cyclopropyl, cyclobutyl, cyclopentyl, cyclohexyl, heptyl, octyl, nonyl, and decyl. Lower alkyl groups can be substituted or unsubstituted.

The term "aromatic" refers to a planar ring having a delocalized π-electron system containing 4n+2 π-electrons, where n is an integer. Aromatic rings can be formed by five, six, seven, eight, nine, or more than nine atoms. Aromatics can be optionally substituted. The term "aromatic" includes both carbocyclic aryl (e.g., phenyl) and heterocyclic aryl (or "heteroaryl" or "heteroaromatic") groups (e.g., pyridine). The term also includes monocyclic or fused-ring polycyclic (i.e., rings which share adjacent pairs of carbon atoms) groups.

As used herein, the term "aryl" refers to an aromatic ring wherein each of the atoms forming the ring is a carbon atom. Aryl rings can be formed by five, six, seven, eight, nine, or more than nine carbon atoms. Aryl groups can he optionally substituted. Examples of aryl groups include, but are not limited to phenyl, naphthalenyl, phenanthrenyl, anthracenyl, fluorenyl, and indenyl. Depending on the structure, an aryl group can be a monoradical or a diradical (i.e., an arylene group).

As used herein, the term "ring" refers to any covalently closed structure. Rings include, for example, carbocycles (e.g., aryls and cycloalkyls), heterocycles (e.g., heteroaryls and non-aromatic heterocycles), aromatics (e.g. aryls and heteroaryls), and non-aromatics (e.g., cycloalkyls and non-aromatic heterocycles). Rings can be optionally substituted. Rings can also form part of a ring system.

As used herein, the term "ring system" refers to two or more rings, wherein two or more of the rings are fused. The term "fused" refers to structures in which two or more rings share one or more bonds.

The terms "heteroaryl," "heteroaromatic" or "aromatic hetercyclic" refers to an aryl group that includes one or more ring heteroatoms selected from nitrogen, oxygen and sulfur. An N-containing "heteroaromatic" or 'heteroaryl' moiety refers to an aromatic group in which at least one of the skeletal atoms of the ring is a nitrogen atom. The polycyclic heteroaryl group may be fused or non-fused. Illustrative examples of N-containing aromatic heterocyclic groups include the following moieties:

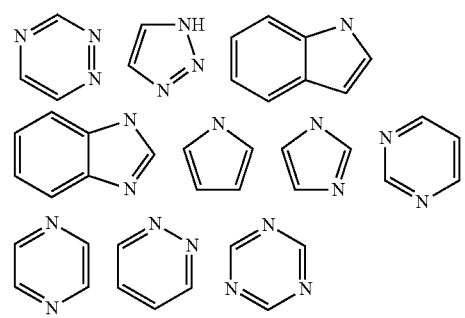

-continued

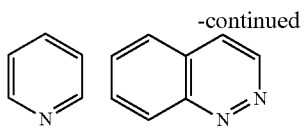

and the like. Depending on the structure, a heteroaryl group can be a monoradical or a diradical (i.e., a heteroarylene group).

The term "membered ring" can embrace any cyclic structure. The term "membered" is meant to denote the number of skeletal atoms that constitute the ring. Thus, for example, cyclohexyl, pyridine, and pyran are 6-membered rings and cyclopentyl and pyrrole, are 5-membered rings.

The term "moiety" refers to a specific segment or functional group of a molecule. Chemical moieties are often recognized chemical entities embedded in or appended to a molecule.

As used herein, the substituent "R" appearing by itself and without a number designation refers to a optional substituent as defined in certain formulas herein.

In the following description of methods in accordance with embodiments of the invention, process steps are carried out at temperatures of 10° C. to 50° C. and pressures of 1 to 10 atmospheres unless otherwise specified. It also is specifically understood that any numerical range recited herein includes all values from the lower value to the upper value, e.g., all possible combinations of numerical values between the lowest value and the highest value enumerated are to be considered to be expressly stated in the application. For example, if a concentration range or beneficial effect range is stated as 1% to 50%, it is intended that values such as 2% to 40%, 10% to 30%, or 1% to 3%, etc., are expressly enumerated in this specification. These are only examples of what is specifically intended.

Further, no admission is made that any reference, including any patent or patent document, citied in this specification constitutes prior art. In particular, it will be understood that unless otherwise stated, reference to any document herein does not constitute an admission that any of these documents forms part of the common general knowledge in the art in the United States or in any other country. Any discussion of the references states what their authors assert, and applicant reserves the right to challenge the accuracy and pertinence of any of the documents cited herein.

It has now been found that the use of electrochemical or photoelectrochemical reduction of carbon dioxide ($CO_2$), tailored with certain electrocatalysts, produces methanol and related products in a high yield of about 60 to about 100%, based on the amount of $CO_2$, suitably about 75 to 90%, and more suitably about 85 to 95%. At an electric potential of about −0.09 to −0.5 V with respect to a standard calomel electrode (SCE), methanol can be produced with good faradaic efficiency at the cathode, The overall reaction for the reduction of $CO_2$ is represented as:

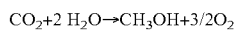

For the 6 e− reduction, the reactions at the cathode and anode are:

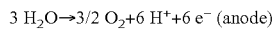

Figure 2:
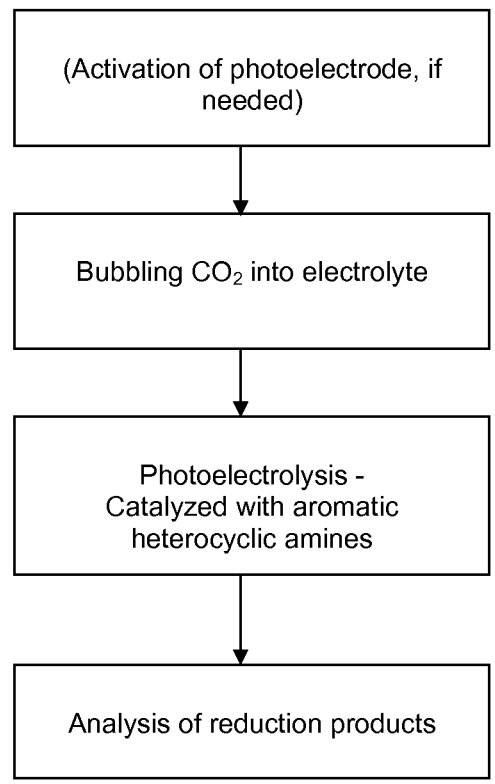
FIG. 2 is a flow chart for the photoelectrochemical reduction of $CO_2$ in accordance with embodiments of the invention.

FIGS. 1 and 2 illustrate the general method in accordance with embodiments of the invention for catalyzed electrochemical and photoelectrochemical conversion of $CO_2$ to reduced organic products. The reduction of $CO_2$ is suitably achieved in an efficient manner in a divided electrochemical or photoelectrochemical cell in which a first compartment contains an anode which is an inert counterelectrode, and a second compartment containing a working cathode electrode and one or more substituted or unsubstituted aromatic heterocyclic amines. The compartments are separated by a porous glass frit or other ion conducting bridge. Both compartments contain an aqueous solution of an electrolyte such as KCl. $CO_2$ is continuously bubbled through the cathodic electrolyte solution to saturate the solution, In the working electrode compartment, carbon dioxide is continuously bubbled through the solution. In one embodiment, if the working electrode is a metal, then an external bias is impressed across the cell such that the potential of the working electrode is held constant, e.g., between −0.5 V to −0.9 V v. SCE. In another embodiment, if the working electrode is a p-type semiconductor, the electrode is suitably illuminated with light of energy equal to or greater than the bandgap of the semiconductor during the electrolysis, and either no external source of electrical energy is required or a modest bias of about 500 mV is applied. The working electrode potential is held constant, e.g. between −0.5 to +0.2 V v. SCE. The electrical energy for the electrochemical reduction of carbon dioxide can come from a conventional energy source, including nuclear and alternatives (hydroelectric, wind, solar power, geothermal, etc.), from a solar cell or other non-fossil fuel source of electricity, provided that the electrical source supply at least 1.6 V across the cell, although this minimum value may be adjusted depending on the internal resistance of the cell employed.

Advantageously, the carbon dioxide used in the embodiments of the invention can be obtained from any sources, e.g., an exhaust stream from fossil-fuel burning power or industrial plants, from geothermal or natural gas wells or the atmosphere itself. Most suitably, however, carbon dioxide is obtained from concentrated point sources of its generation prior to its release into the atmosphere. For example, high concentration carbon dioxide sources are those frequently accompanying natural gas in amounts of 5 to 50%, those from flue gases of fossil fuel (coal, natural gas, oil, etc.) burning power plants, and nearly pure $CO_2$ exhaust of cement factories and from fermenters used for industrial fermentation of ethanol. Certain geothermal steams also contains significant amounts of $CO_2$. In other words, $CO_2$ emissions from varied industries, including geothemial wells, can be captured onsite. Separation of $CO_2$ from such exhausts is well-developed. Thus, the capture and use of existing atmospheric $CO_2$ in accordance with embodiments of the invention allows $CO_2$ to be a renewable and unlimited source of carbon.

For electrochemical conversion. $CO_2$ is readily reduced in the aqueous medium with a metal electrode, such as a Pt and hydrogenated Pd electrode, although other metal electrodes. e.g., Au, Ag, Zn, Ga, Hg, In, Cd and Ti may also be effective. Faradaic efficiencies have been found to be high, reaching about 100%.

For photoelectrochemical conversion, $CO_2$ is readily reduced with a p-type semiconductor electrode, such as p-GaP, p-GaAs, p-InP, p-InN, p-WSe$_2$, p-CdTe, p-GaInP$_2$ and p-Si.

In embodiments of the invention, the electrochemical/photoelectrochemical reduction of $CO_2$ utilizes one or more substituted or unsubstituted aromatic heterocyclic amines as homogeneous catalysts in aqueous solution. Aromatic heterocyclic amines include, for example, unsubstituted and substituted pyridines, pyroles, imidazoles and benzimidazoles. Substituted pyridines and imidazoles may include mono- and disubstituted pyridines and imidazoles. For example, suitable catalysts may include straight chain or branched chain lower alkyl (e.g., $C_1$-$C_{10}$) mono- and disubstituted compounds such as 2-methylpyridine, 4-tertbutyl pyridine, 2,6-dimethylpyridine (2,6-lutidine); hipyridines, such as 4,4'-bipyridine; amino-substituted pyridines, such as 4-dimethylamino pyridine and hydroxyl-substituted pyridines, e.g., 4-hydroxy-pyridine, and substituted or unsubstituted quinoline or isoquinolines. Catalysts may also suitably include substituted or unsubstituted dinitrogen heterocyclic amines such a pyrazine, pyridazine and pyrimidine.

In some embodiments, the aromatic heterocyclic amine catalysts may be represented by formula 1:

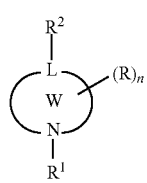

(1)

wherein the ring structure W is an aromatic 5- or 6-member heterocylic ring with at least one ring nitrogen and is optionally substituted at one or more ring positions other than nitrogen with R, and wherein L is C or N, $R^1$ is H, $R^2$ is H if L is N or $R^2$ is R if L is C, and R is an optional substituent on any ring carbon and is independently selected from H, straight chain or branched chain lower alkyl, hydroxyl, amino, pyridyl, or two R's taken together with the ring carbons to which they are bonded are a fused six-member aryl ring, and n=0 to 4.

In some embodiments, the substituted or unsubstituted aromatic 5- or 6-member heterocyclic amines may be represented by the following formulas (2), (3) or (4) For example, a catalyst in accordance with embodiments of the invention which is a 6-member heterocycline ring having one nitrogen in the ring is represented by formula (2):

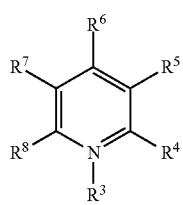

(2)

wherein $R^3$ is H; $R^4$, $R^5$, $R^7$ and $R^8$ are independently H, straight chain or branched chain lower alkyl, hydroxyl, amino, or taken together with the ring carbons to which they are bonded are a fused six-member aryl ring, and $R^5$ is H, straight chain or branched chain lower alkyl, hydroxyl, amino or pyridyl.

A catalyst in accordance with embodiments of the invention which is a 6-member heterocyclic amine having two nitrogen in the ring is represented by formula (3):

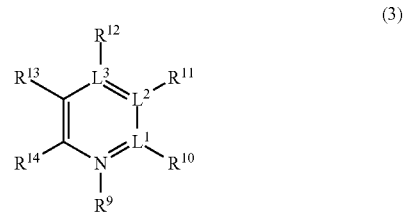

(3)

wherein one of $L^1$, $L^2$ and $L^3$ is N, while the other L's are C, $R^9$ is H, if $L^1$ is N, then $R^{10}$ is H, if $L^2$ is N, then $R^{11}$ is H, and if $L^3$ is N, then $R^{12}$ is H; and if $L^1$, $L^2$ or $L^3$ is C, then $R^{10}$, $R^{11}$, $R^{12}$, $R^{13}$ and $R^{14}$ are independently selected from straight chain or branched chain lower alkyl, hydroxyl, amino, or pyridyl.

A catalyst in accordance with embodiments of the invention which is a 5-member heterocyclic amine having one or two nitrogen in the ring is represented by formula (4):

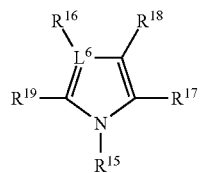

(4)

wherein $L^5$ is N or C, $R^{15}$ is H, $R^{16}$ is H if $L^5$ is N, or if is C, $R^{16}$, $R^{17}$, $R^{18}$, and $R^{19}$ are independently selected from straight chain or branched chain lower alkyl, hydroxyl, amino, or pyridyl, or $R^{17}$ and $R^{18}$ taken together with the ring carbons to which they are bonded are a fused six-member aryl ring.

Suitably, the concentration of aromatic heterocyclic amine catalysts is about 1-mM to 1 M. The electrolyte is suitably a salt, such as KCl or $NaNO_3$, at a concentration of about 0.5M. The pH of the solution is maintained at about pH 3-6, suitably about 4.7- 5.6.

At metal electrodes, formic acid and formaldehyde were found to be intermediate products along the pathway to the 6 $e^-$ reduced product of methanol, with an aromatic amine radical, e.g. the pyridinium radical, playing a role in the reduction of both intermediate products. It has been found, however, that these intermediate products can also be the final products of the reduction of $CO_2$ at metal or p-type semiconductor electrodes, depending on the particular catalyst used. Other C—C couple products are also possible. For example, reduction of $CO_2$ can suitably yield formaldehyde, formic acid, glyoxal, methanol, isopropanol, or ethanol, depending on the particular aromatic heterocyclic amine used as the catalyst. In other words, in accordance with the invention, the products of the reduction of $CO_2$ are substitution-sensitive. As such, the products can be selectively produced. For example, use of 4,4'-bipyridine as the catalyst can produce methanol and/or 2-propanol; lutidines and amino-substituted pyridines can produce 2-propanol; hydroxy-pyridine can produce formic acid; imidazoles can produce methanol or formic acid depending on conditions.

The effective electrochemical/photoelectrochemical reduction of carbon dioxide disclosed herein provides new methods of producing methanol and other related products in an improved, efficient, and environmentally beneficial way, while mitigating $CO_2$-caused climate change (e.g. global warming).

Moreover, the methanol product of reduction of carbon dioxide can be advantageously used as (1) a convenient energy storage medium, which allows convenient and safe storage and handling; (2) a readily transported and dispensed fuel, including for methanol fuel cells; and (3) a feedstock for synthetic hydrocarbons and theft products currently obtained from oil and gas resources, including polymers, biopolymers and even proteins, which can be used for animal feed or human consumption. Importantly, the use of methanol as an energy storage and transportation material eliminates many difficulties of using hydrogen for such purposes. The safety and versatility of methanol makes the disclosed reduction of carbon dioxide further desirable.

EXAMPLES

Embodiments of the invention are further explained by the following examples, which should not be construed by way of limiting the scope of the invention.

Example 1

General Electrochemical Methods

Chemicals and materials. All chemicals used were >98% purity and used as received from the vendor (e.g., Aldrich), without further purification. Either deionized or high purity water (Nanopure, Barnstead) was used to prepare the aqueous electrolyte solutions.

Electrochemical system. The electrochemical system was composed of a standard two-compartment electrolysis cell to separate the anode and cathode reactions. The compartments were separated by a porous glass frit or other ion conducting bridge. 0.5 M KCl (EMD >99%) was used as the supporting electrolyte. A concentration of the desired aromatic heterocyclic amine, such as pyridine, pyridine derivative, imidazole, imidazole derivative, of between about 1 mM to 1M was used.

The working electrode consisted of a known area Pt foil connected to a Pt wire (both Aldrich) or a Pd foil (Johnson Matthey), Pd electrodes were hydrogenated at a current density of 15 mA cm$^{-2}$ in 1 M $H_2SO_4$ until ~73 C were passed. All potentials were measured with respect to a saturated calomel reference electrode (SCE) (Accumet). The three-electrode assembly was completed with a Pt mesh electrode also connected to a Pt wire. Before and during all electrolyses, $CO_2$ (Airgas) was continuously bubbled through the electrolyte to saturate the solution. The resulting pH of the solution was maintained at about pH 3 to pH 6, suitably, pH 4.7 to pH 5.6, depending on the aromatic heterocyclic amine employed. For example, under constant $CO_2$ bubbling, the pH's of 10 mM solutions of 4-hydroxy pyridine, pyridine, and 4-tertbutyl pyridine were 4.7, 5.28 and 5.55, respectively. For NMR experiments, isotopically enriched $^{15}N$ pyridine (>98%) and $^{13}C$ $NaHCO_3$ (99%) were obtained from Cambridge Isotope Laboratories, Inc.

Example 2

General Photoelectrochemical Methods

Chemicals and materials. All chemicals used in this work were analytical grade or higher. Either deionized or high purity water (Nanopure, Barnstead) was used to prepare aqueous electrolyte solutions.

Photoelectrochemical system. The photoelectrochemical system was composed of a Pyrex three-necked flask containing 0.5 M KCl as supporting electrolyte and a 1 mM-1M catalyst, e.g., 10 mM pyridine or pyridine derivative. The photocathode was a single crystal p-type semiconductor, which was etched for ~1-2 min in a bath of concentrated HNO3:HCl, 2:1 v/v prior to use. An ohmic contact was made to the hack of the freshly etched crystal using an indium/zinc (2 wt. % Zn) solder. It was then connected to an external lead with conducting silver epoxy (Epoxy Technology H31), that was covered in glass tubing, and insulated using an epoxy cement (Loctite 0151 Hysol) to expose only the front face of the semiconductor to solution. All potentials were referenced against a saturated calomel electrode (Accurnet). The three-electrode assembly was completed with a carbon rod counter electrode to minimize the re-oxidation of reduced $CO_2$ products. During all electrolyses, $CO_2$ (Airgas) was continuously bubbled through the electrolyte to saturate the solution. The resulting pH of the solution was maintained at about pH 3-pH 6, e.g., pH 5,2.

Light sources. Four different light sources were used for the illumination of the p-type semiconductor electrode. For initial electrolysis experiments, a Hg—Xe arc lamp (USHIO UXM 200H) was used in a lamp housing (PTI Model A-1010) and powered by a PTI LTS-200 power supply. Similarly, a Xe arc lamp (USHIO UXL 151H) was used in the same housing in conjunction with a PTI monochromator to illuminate electrode at various specific wavelengths. A fiber optic spectrometer (Ocean Optics S2000) or silicon photodetector (Newport 818-SL silicon detector) was used to measure the relative resulting power emitted through the monochromator. The flatband potential was obtained by measurements of the open circuit photovoltage during various irradiation intensities using the 200 W Hg—Xe lamp (3 W!cm2-23 W/cm2). The photovoltage was observed to saturate at intensities above ~6 W/cm2. For quantum yield determinations, electrolyses were performed under illumination by two different light emitting diodes (LEDs). A blue LED (Luxeon V Dental Blue, Future Electronics) with a luminous output of 500 mW+/−50 mW at 465 nm and a 20 nm fwhm was driven at its maximum rated current of 700 mA using a Xitanium Driver (Advance Transformer Company). A Fraen collimating lens (Future Electronics) was used to direct the output light. The resultant power density that reached the window of the photoelectrochemical cell was determined to be 42 mW/cm2, measured using a Scientech 364 thermopile power meter and silicon photodector. It was assumed that the measured power density is greater than the actual power density observed at the semiconductor face since there is luminous intensity loss through the solution layer between the wall of the photoelectrochemical cell and the electrode.

Example 3

Analysis of Products of Electrolysis

Electrochemical experiments were performed using a PAR 173 patentiostat-galvanostat together with a PAR 379 digital coulometer, a PAR 273 potentiostat-galvanostat, or a DLK-60 electrochemical analyzer. Electrolyses were run under potentiostatic conditions from ~6-30 hrs until a relatively similar amount of charge was passed for each run.

Gas Chromatography. The electrolysis samples were analyzed using a gas chromatograph (HP 5890 GC) equipped with an FID detector. Removal of the supporting electrolyte salt was first achieved with Amberlite IRN-150 ion exchange resin (cleaned prior to use to ensure no organic artifacts by stirring in a 0.1% v/v aqueous solution of Triton X-100, reduced (Aldrich), filtered and rinsed with a copious amount of water, and vacuum dried below the maximum temperature of the resin (−60° C.) before the sample was directly injected into the GC which housed a DB-Wax column (Agilent Technologies, 60 m, 1 μm film thickness.) Approximately 1 g of resin was used to remove the salt from 1 mL of sample. The injector temperature was held at 200° C. the oven temperature maintained at 120° C. and the detector temperature at 200° C. During a typical run, only peaks related to the elution of methanol and pyridine were observed.

Spectrophotometry; The presence of formaldehyde and formic acid was also determined by the chromotropic acid assay. Briefly, a solution of 0.3 g of 4,5-dihydroxynaphthalene-2,7-disulfonic acid, disodium salt dihydrate (Aldrich) was dissolved in 10 mL deionized water before diluting to 100 mL with concentrated sulfuric acid. For formaldehyde, an aliquot of 1.5 mL was then added to 0.5 mL of sample. The presence of formaldehyde (absorbance at 577 nm) was detected against a standard curve using an HP 8453 UV-Vis spectrometer. For formic acid, a 0.5 mL aliquot of sample was first reduced with a ~100 mg piece of Mg wire and 0.5 mL concentrated hydrochloric acid (added slowly in aliquots over a 10 min period) to convert to formaldehyde before following the chromotropic acid assay as described above.

Mass spectrometry. Mass spectral data was also collected to identify all organics. In a typical experiment, the sample was directly leaked into an ultrahigh vacuum chamber and analyzed by an attached SRS Residual Gas Analyzer (with the ionizer operating at 70 eV and an emission current of 1 mA). Samples were analyzed against standard methanol spectra obtained at the same settings to ensure comparable fragmentation patterns. Mass spectral data confirmed the presence of methanol and also proved that the initial solution before electrolysis contained no reduced $CO_2$ species. Control experiments also showed that after over 24 hours under illumination the epoxy used to insulate the backside of the electrode did not leach any organic material that would give false results for the reduction of $CO_2$ [17]NMR spectra of electrolyte volumes after illumination were obtained using an automated Balker Ultrashieki™ 500 Plus spectrometer with an excitation sculpting pulse technique for water suppression. Data processing was achieved using MestReNova software. For methanol standards and electrolyte samples, the representative signal for methanol was observed between 3.18-3.30 ppm.

NMR. NMR spectra of electrolyte volumes after bulk electrolyses were also obtained using an automated Bruker Ultrashield™ 500 Plus spectrometer with an excitation sculpting pulse technique for water suppression. Data processing was achieved using MestReNova software. The concentrations of formate and methanol present after bulk electrolyses were determined using acetone as the internal standard. For $^{15}N$—$^{13}C$ coupling experiments, $^{13}C$ NMR spectra were obtained using an automated Bruker Ultrashield™ 500 Plus spectrometer tuned for maximum $^{13}C$ sensitivity. In a typical experiment, an aqueous solution containing 10% deuterium oxide (Cambridge Isotope Laboratories, Inc., >99.9%), 0.5M KCl, 50 mM of $^{15}N$ pyridine, and 33 mM of $^{13}C$ $NaHCO_3$ was first purged with Ar in a septa sealed NMR tube; then pH was adjusted using 1 M $H_2SO_4$ to a pH of 5.2. At this pH, the bicarbonate was observed to be completely in the dissolved $^{13}CO_2$ form. No peak associated with $HCO_3$ was seen. The temperature of the experiment was maintained at 295° K, however, the temperature of the instrument was also adjusted to access the temperature dependence on the $^{15}N$—$^{13}C$ coupling. The sample tube was held for at least 10 minutes at the given temperature before the spectra were obtained to ensure temperature equilibrium. A temperature range of 275° K. to 306° K. was examined.

Example 4

Electrolysis with Monosubstituted Pyridines

Electrolyses were performed for various monosubstituted pyridines. These electrocatalysts were present at a concentration of 10 mM in 50 mL of water and 0.5 M KCl (as the supporting electrolyte). The cathode was either Pt or hydrogenated Pd, galavanostatically held at 50 μA $cm^{-2}$, and saturated with $CO_2$. Products of the electrolyses were analyzed as described above in Example 3. The results, which are the averages of at least three experiments, are given in Table 1 below.

TABLE 1

Results for bulk electrolyses for monoalkyl or amino-substituted pyridine electrocatalysts

| | Faradaic Yield (%) | | |
|---|---|---|---|
| Electrocatalyst | HCOOH[a] | $CH_3OH$ | Total Yield[e] |
| pyridinium | 10.8 ± 0.5 | 22 ± 2 | 33 ± 3 |
| 2-methyl pyridinium | 16 ± 4 | 26 ± 4 | 42 ± 8 |
| 4-methyl pyridinium | 7 ± 3 | 31 ± 3 | 38 ± 6 |
| 4-tertbutyl pyridinium | trace | 14.5 ± 2 | 14.5 ± 2 |
| 4-amino pyridinium | 12 ± 4 | 39 ± 4 | 51 ± 8 |
| 4-dimethyl amino pyridinium | 7 ± 2 | 11 ± 1 | 18 ± 3 |
| 4-hydroxy pyridinum | 12 ± 1 | 15 ± 3 | 27 ± 4 |

[a]Mostly in the formate form at the pH's of the solutions used;
[e]Total faradaic yield for observed $CO_2$-derived products, not including competing hydrogen generation.

Example 5

Electrolysis of Dialkylsubstituted Pyridines (Lutidines)

Electrolyses were performed for various disubstituted pyridines or lutidines. These electrocatalysts were present at a concentration of 10 mM in 50 mL of water and 0.5 M KCl (as the supporting electrolyte). The cathode was either Pt or hydrogenated Pd. galavanostatically held at 50 μA $cm^2$, and saturated with $CO_2$. Products of the electrolyses were analyzed a described above in Example 3. The results, which are the averages of at least three experiments, are given in Table 2 below.

TABLE 2

Results for bulk electrolyses for various lutidine electrocatalysts

| | Faradaic efficiency η, % | | | | |
|---|---|---|---|---|---|
| Electrocatalyst | Acetaldehyde | Acetone | Methanol | 2-propanol | Ethanol |
| 3,5-lutidinium | trace | trace-5.9 | 3.2-8.0 | trace-9.5 | trace-5.3 |
| 3,4-lutidinium | trace | trace-5.6 | 4.4-9.2 | trace-12 | trace-3.0 |
| 2,3-lutidinium | trace | trace-9.4 | 5.9-8.4 | trace-12 | trace-3.4 |
| 2,4-lutidinium | trace | trace-8.6 | 4.5-13 | trace-16 | trace-5.4 |
| 2,6-lutidinium | trace | 2.9-5.8 | 3.6-8.2 | trace-14 | trace-6.3 |

Example 6

Electrolysis of 4,4'-bipyridine

Electrolysis was carried out in aqueous solution containing 10 mM 4,4'-bipyridine with 0.5 M KCl as the supporting electrolyte. The pH was maintained at a constant 5.22, under $CO_2$ saturation. The results represent the average of at least three independent experiments, and are given below in Table 3.

TABLE 3

Electrolysis of 4,4'-bipyridine

| | Faradaic efficiency η, % | | | | |
|---|---|---|---|---|---|
| E (V)a | Acetaldehyde | Acetone | Methanol | 2-Propanol | Ethanol |
| −0.725 | trace | 3 ± 1 | 53 ± 13 | 4 ± 2 | trace |
| −1.1 | trace | 7 ± 4 | 20 ± 2 | 20 ± 8 | trace |

Example 7

Photoelectrolysis of lutidines and Bipyridine

Photoelectrolysis was carried out in aqueous solution containing 10 mM lutidine or bypyridine electrocatalyst in 50 mL water with 0.5 M KCl as the supporting electrolyte. The pH was maintained at a constant 4.7, under $CO_2$ saturation. The photoelectrochemical cell was a p-GaP, p-GaInP2, or p-Si photoelectrode. For the p-GaP system, the wavelength of 365 nm was chosen to correspond to the lowest energy direct bandgap of 2.8 eV. With an indirect bandgap of 2.24 eV, p-GaP can only absorb ~17% of solar radiation. Therefore, both a p-GaInP2 photocathode, with a direct bandgap of 1.81 eV, and p-Si, with an indirect bandgap of 1.12 eV, were examined as potential photoelectrodes to increase the percentage of solar radiation that can be converted into stored chemical energy. The commercially available wavelengths of 465 nm and 530 nm were examined for illumination of the p-GaInP$_2$ cell and the p-Si cell, respectively. However, wavelengths as long as ~685 nm and ~1100 nm can he used to excite p-GaInP$_2$ and p-Si, respectively.

At a pH of 5.22 for the 4,4'-bipyridine system, the thermodynamic potential for the reduction of $CO_2$ to methanol is approximately −0.52 V vs. SCE. At the pH of 5.55 for the lutidine-based system, this potential is ~0.54 V vs. SCE. Similarly, the thermodynamic reduction potential of $CO_2$ to 2-propanol at the pH's of 5.22 and 5.55 is −0.52 V vs. SCE and −0.54 V vs. SCE, respectively. The results of bulk electrolysis given as faradaic efficiencies are reported below in Table 4.

TABLE 4.4

Faradaic efficiencies and quantum yields for the reduction of $CO_2$ to various products.

| | | | | Faradaic Efficiency η, (%) | | | | |
|---|---|---|---|---|---|---|---|---|
| | Cat. | E(V) vs. SCE | j(μA/cm$^2$) | Acetal | Acetone | MeOH | 2-PrOH | EtOH |
| p-GaInP$_2$ 465 nm | 4,4' | −0.5 | 241 | Trace | trace | 5.5 | 1.5 | — |
| | 4,4' | −0.4 | 181 | Trace | trace | 8.2 | 2.8 | — |
| | 4,4' | −0.3 | 70 | Trace | trace | 29 | 22 | — |
| | 3,5 lut[a] | −0.5 | 146 | Trace | 5.9 | 7.2 | 3.7 | — |
| | 2,3 lut | −0.5 | 8.1 | Trace | trace | 9.2 | 5.3 | — |
| | 2,4 lut | −0.5 | 161 | Trace | trace | 21 | 8.3 | — |
| | 2,6 lut | −0.5 | 14 | Trace | trace | 51 | 21 | — |
| p-GaP 365 nm | 3.5 lut | −0.5 | 10 | Trace | 2.9 | 51 | trace | — |
| | 3,4 lut | −0.5 | 13 | Trace | trace | 63 | 15 | — |
| | 2,3 lut | −0.5 | 42 | Trace | trace | 48 | 28 | — |
| | 2,4 lut | −0.5 | 32 | Trace | trace | 21 | 29 | — |
| | 2.6 lut | −0.5 | 9.5 | Trace | trace | 38 | 63 | — |
| | 4,4' | −0.4 | 70 | Trace | trace | 11 | 5 | — |
| p-Si 530 nm | 4,4' | −0.6 | 41.5 | Trace | trace | 18 | 24 | — |

[a]"lut" is a an abbreviation for lutidine; 4,4' is an abbreviation for 4,4'-bipyridine.

Enhanced yields were observed for the lutidinium catalysts and high yields for 4,4'-bipyridinium. In some instances, nearly 100% faradaic yields were observed for $CO_2$-derived products. The yields for 2-propanol represent the highest reported 2-propanol yields known to the inventors with 2,6-lutidine in a p-GaP photoelectrochemical system yielding as high as 63% faradaic efficiency for 2-propanol. The data reported in Table 4 for methanol and 2-propanol, at −0.5 V vs. SCE and potentials less negative, was observed at essentially zero overpotential, that is, at a potential approaching the short circuit potential for the iR compensated cell. This corresponds to the conversion of light energy into storable chemical energy in the form of highly reduced $CO_2$ products. To the inventors' best knowledge, this is the first report of the reduction of $CO_2$ to 2-propanol using only energy.

Example 9

Electrolysis/Photoelectrolysis of Imidazoles

Electrolyses are performed for various imidazoles, including benzimidazoles. These electrocatalysts are present at a concentration of 10 mM in 50 mL of water and 0.5 M KCl (as the supporting electrolyte). The cathode is Pt or illuminated P-GaP, galavanostatically held at 50 μA cm$^{-2}$, and saturated with $CO_2$. Products of the electrolyses are analyzed as described above in Example 3.

Example 10

Electrolysis/Photoelectrolysis at Varying Temperatures and Pressures

Electrolyses are carried out at various temperatures and pressures to determine their effect on the products and yield. Electrolyses are carried out at temperatures from 10° C. to 50° C. The results demonstrate that the kinetics of the electrolysis reaction are increased with increased temperature, with peak currents following the Arrhenius rate law with an observed activation barrier of 10-15 kJ/mole, although the solubility of the $CO_2$ is decreased with increased temperature.

Electrolyses are carried out at pressure from 1 atmosphere to 10 atmospheres. The results demonstrate that product yields can be increased with increased pressure due to the increased solubility of $CO_2$ at higher pressures. For example, pressure data at 5 atm indicates a 3.5 increase in current compared to 1 atm.

Temperature and pressure can be optimized to produce efficient and higher product yields.

In summary, embodiments of the invention provide that carbon dioxide can be efficiently converted to value added products, using either a minimum of electricity (that could be generated from an alternate energy source) or directly using visible light. The processes of the embodiments of the invention generate high energy density fuels that are not fossil-based as well as being chemical feedstocks that are not fossil or biologically based. Moreover, the catalysts for these processes are substituents-sensitive, and provide for selectivity of the value added products.

The foregoing description is considered as illustrative only of the principles manifest in embodiments of the invention. Numerous modifications and changes may readily occur to those skilled in the art, and it is not desired to limit the invention to the exact construction and operation shown and described, and accordingly, all suitable modifications and equivalents are considered to fall within the scope of the invention. Various features and advantages of the invention are set forth in the appended claims and their equivalents. It is intended that the scope of the present invention be limited solely by the broadest interpretation that lawfully can he accorded the appended claims.

All publications, patents and patent applications referenced in this specification are indicative of the level of ordinary skill in the art to which this invention pertains. All publications, patents and patent applications are herein expressly incorporated by reference to the same extent as if each individual publication or patent application was specifically and individually indicated by reference. In case of conflict between the present disclosure and the incorporated patents, publications and references, the present disclosure should control.

REFERENCES

1. Dubois, D. L. Electrochemical Reactions of Carbon Dioxide. In *Encyclopedia of Electrochemistry*, Bard, A. J.; Stratma, M Eds. Wiley-VCH Verlag GmbH & Co. KGaA: Weinheim, 2006; pp 202-225.
2. Frese, J. K. W. Electrochemical Reduction of $CO_2$ at Solid Electrodes, In *Electrochemical and Electrocatalytic Reactions of Carbon Dioxide*, Sullivan, B. P.; Krist, K.; Guard, H. E., Eds. Elsevier: Amsterdam, 1993; pp 145-216.
3. Heimann, M. M.; Steinberg, M., Electrochemical Reduction of $CO_2$. In *Greenhouse Gas Carbon Dioxide Mitigation: Science and Technology*, Heimann, M. M.; Steinberg, M., Eds. Lewis Publishers: Boca Raton, 1999; pp 411-515.
4. Hari, Y., Electrochemical $CO_2$ Reduction on Metal Electrodes. In *Modem Aspects of Electrochemistry*, Vayenas, C. G.; White, R. E.; Gamboa-Aldeco, M. E., Eds. Springer: New York, 2008; Vol 42, pp 89-189.
5. Taniguchi, I., Electrochemical and Photoelectrochemical Reduction of Carbon Dioxide. In *Modern Aspects of Electrochemistry*, Bockns, J. M.; Conway, B. E.; White, R. E., Eds. Springer: New York, 1989; Vol. 20, pp 327-400.
6. Heimann, M. M.; Steinberg, M., Photoelectrochemical Reduction of $CO_2$. In *Greenhouse Gas Carbon Dioxide Mitigation: Science and Technology*, Halmann, M. M.; Steinberg, M., Eds. Lewis Publishers; Boca Raton, 1999; pp 517-527.
7. Lewis, N. S.; Shreve. G. A., Photochemical and Photoelectrochemical Reduction of Carbon Dioxide, In *Electrochemical and Electrocatalytic Reactions of Carbon Dioxide*, Sullivan, B. P.; Krist, K.; Guard, H. E., Eds. Elsevier: Amsterdam, 1993; pp 263-289.
8. Heinze, K.; Hempel, K.; Beckmann, M., *Eur. J. Thong. Chem.* 2006, 2040-2050.
9. Heyduk, A. F.; Macintosh, A. M.; Nocera, D. G., *J. Am. Chem. Soc.* 1999, 121, 5023-5032.
10. Rosenthal, J.; Bachman, J., Dempsey, J. L.; Esswein, A. J.; Gray, T. G.; Hadgkiss, J. M.; Menke. D. R.; Luckett, T. D.; Pistorio, B. J.; Veige, A. S.; Nocera, D. G., *Coord. Chem. Rev.* 2005, 249, 1316-1326.
11. Bien, Z.-Y.; Sumi, K; Furue, M.; Sato, S.; Koike, K.; Ishitani, O., *Inorg. Chem.*, 2008, 10801-10803.
12. Tanaka, K.; Ooyama, D., *Coord. Chem. Rev.* 2002, 226, 211-218.
13. Toyohara, K.; Nagao, H.; Mizukawa, T.; Tanaka, K., *Inorg. Chem.* 1995, 34, 5399-5400.
14. Seshadri, G.; Lin, C.: Bocarsly, A. B., *J. Electroanal. Chem.* 1994, 372, 145-150.
15. Barton, E. E.; Rampulla, D. M., Bocarsly, A. B., *J. Am. Chem, Soc.* 2006, 130, 6342-6344.
16. Bandi, A.; Kuhne, H., *J. Electrochern. Soc.* 1992, 139, 1605-1610.

17. Frese, K.; Leach, S., *J. Electrochem. Soc.* 1985, 132, 259-260.
18. Li, J.; Prentice, G., *J. Electrochem, Soc.* 1997, 144, 4284-4288.
19. Ohkawa, K.; Noguchi, Y.; Nakayama, S.; Hashimoto, K.; Fujishima, A., *J. Electroanal. Chem.* 1994, 367, 165-173.
20. Popic, J.; Avramoylvic, M.; Vukovic, N., *J. Electroanal. Chem.* 1997, 421, 105-110.
21. Qu, J.; Zhang, X.; Wang, Y.; Xie, C., *Electrochim. Acta* 2005, 50, 3576-3580.
22. Summers, D.; Leach, S.; Frese, K., *J. Electroanal. Chem,* 1986, 205, 219-232.
23. Watanabe, M.; Shihata, M.; Kato, A.; Azurna, M.; Sakata, T., *J. Electrochem. Soc.* 1991, 138, 3382-3389.
24. Aurian-blajeni, B.; Halmann, M.; Manassen, J., *Sol. Energy Mater.* 1983, 8, 425-440.
25. Canfield, D.; Frese, J. K. W., *J. Electrochem. Soc.* 1983, 130, 1772-1773.
26. Halmann, M., *Nature* 1978, 275, 115-116.
27. Ogura, K.; Takagi, M., *J. Electroanal. Chem.* 1986, 206, 209-216.
28. Baumgartel, H.; Retzlav, K.-J., Heteroaromatic Compounds. In *Encyclopedia of Electrochemistry of the Elements*, Bard, A. J.; Lund, H., Eds. Marcel Dekker: New York, 1984; Vol. XV, pp 194.
29. Olmstead, M L.; Nicholson, R. S., *Anal. Chem.* 1969, 41, 862-864.
30. Bard, A. J.; Faulkner, L. R., *Electrochemical Methods, Fundamentals and Applications*. $2^{nd}$ ed.; Wiley: New York, 2001; pp 501-503.
31. Nicholson, R. S.; Shain, I., *Anal. Chem,* 1964, 36, 706-723.
32. Frese, J. K. W., Electrochemical Reduction of $CO_2$ at Solid Electrodes. In *Electrochemical and Electrocatalytic Reactions of Carbon Dioxide*, Sullivan, B. P.; Krist, K.; Guard, H. E., Eds. Elsevier: Amsterdam. 1993; pp 146.
33. Gaussian 03, version C.02; Gaussian, Inc.: Wallingford, Conn., 2004.
34. Han, S. Y.; Chu, I.; Kim, J. H.; Song, J. K.; Kim, S. K., *J. Chem. Phys.* 2000, 113, 596-601.
35. Ochterski, J. W. *Thermochemistry in Gaussian*; Gaussian, Inc.: 2000; pp 1-19.
36. Gennaro. A.; Isse, A. A.; Saveant, J. M.; Severin, M. G.; Vianello, E., *J. Am. Chem. Soc.* 1996, 118, 7190-7196.
37. Rudolph, M.; Deutz, S.; Jager, E. G., *J. Am. Chem. Soc.* 2000, 122, 10821-10830.
38. Frese, J. K. W., Electrochemical Reduction of $CO_2$ at Solid Electrodes. In *Electrochemical and Electrocatalytic Reactions of Carbon Dioxide*, Sullivan, B. P.; Krist, K.; Guard, H. E., Eds. Elsevier: Amsterdam, 1993; pp 148.
39. Bundgaard, T.; Jakobsen, H. J.; Rahkamaa, E. J., *J. Magn. Reson.* 1975, 19, 345-356.
40. Lichter, R. L.; Roberts, J. D., *J. Am. Chem. Soc.* 1971, 93, 5218-5224.
41. Baden, B., Bewick. A.; Lamy, C., *J. Electroanal. Chem.* 1983, 148, 147-160.
42. Chang, S. C.; Ho, Y. H.; Weaver, M. J., *Surf. Sci.* 1992, 265, 81-94.
43. Iwasita, T.; Nart, F. C.; Lopez, B. Vielstich, W., *Electrochim. Acta* 1992, 37, 2361-2367.
44. Kunimatsu, K.; Kite, H, *J. Electroanal. Chem.* 1987, 218, 155-172.
45. Sun, S. G.; Clavilier, J.; Bewick, A., *J. Electroanal. Chem.* 1988, 240, 147-159.
46. Sun, S. G.; Lin, Y.; Li, N. H.; Mu, J. Q., *J. Electroanal, Chem.* 1994, 370, 273-280.
47. Columbia, M. R.; Crabtree, A. M.; Thiel, P. A., *J. Am. Chem. Soc.* 1992, 114, 1231-1237.
48. Szklarczyk, M.; Sobkowski, J.; Pacocha, J., *J. Electroanat, Chem.* 1986, 215, 307-316.
49. Heimann, M. M.; Steinberg, M., Electrochemical Reduction of $CO_2$. In *Greenhouse Gas Carbon Dioxide Mitigation: Science end Technology*, Halmann, M. M.; Steinberg, M., Eds, Lewis Publishers: Boca Raton, 1999; pp 415.
50. Clarke, S.; Harrison, J. A., *J. Electroanal. Chem.* 1972, 36, 109-115.
51. Bell, R. P.; Evans, P. G., *Proc. R. Soc. London, Ser. A* 1966, 291, 297-323.
52. Birstein, G.; Lobanow, N., *Z. Anorg. Chem.* 1927, 160, 377-386.
53. Gelb, K. H., *Z. Phys. Chem,* 1934, 169, 41-51.
54. Martin, R. J. L., *Aust. J. Chem,* 1954, 7, 335-347.
55. Molt, E. L., *Recl. Trav. Chim. Pays-Bas.* 1937, 56, 233-246.
56. Hwang, T.; Shaka, A., *J. Magri. Rosen., Ser. A* 1995, 112, 275-279.
57. Shirley, D. A., *Phys. Rev.* 1972, 135, 4709-4712.

The invention claimed is:

1. An environmentally beneficial method of producing methanol by electrochemical reduction of any available source of carbon dioxide, which comprises:

providing a divided electrochemical cell comprising an anode in a first cell compartment and a cathode in a second cell compartment that also contains a catalyst which is one or more of a substituted or unsubstituted aromatic heterocyclic amine selected from the group consisting of a pyrazine, a pyridazine, and a pyrimidine, both compartments containing an aqueous solution of an electrolyte;

providing carbon dioxide from an existing source into the second cell compartment; and electrochemically reducing the carbon dioxide in the second cell compartment to produce methanol.

* * * * *